(12) United States Patent
Yamanaka et al.

(10) Patent No.: US 6,873,384 B2
(45) Date of Patent: Mar. 29, 2005

(54) REFLECTION BOARD, REFLECTION TYRE LIQUID CRYSTAL DISPLAY UNIT AND PRODUCTION METHOD THEREFOR, OPTICAL MEMBER, DISPLAY UNIT, ILLUMINATING DEVICE, DISPLAY BOARD, AND UNDULATORY MEMBER

(75) Inventors: Yasuhiko Yamanaka, Osaka (JP); Yoshihiro Sakurai, Ishikawa (JP); Naohide Wakita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 45 days.

(21) Appl. No.: 10/018,032

(22) PCT Filed: Apr. 16, 2001

(86) PCT No.: PCT/JP01/03210
§ 371 (c)(1),
(2), (4) Date: Dec. 14, 2001

(87) PCT Pub. No.: WO01/79896
PCT Pub. Date: Oct. 25, 2001

(65) Prior Publication Data
US 2003/0007113 A1 Jan. 9, 2003

(30) Foreign Application Priority Data
Apr. 17, 2000 (JP) .......................................... 2000-114868
Apr. 24, 2000 (JP) .......................................... 2000-122728

(51) Int. Cl.⁷ ............................................. G02F 1/1335
(52) U.S. Cl. ........................................................ 349/113
(58) Field of Search ............................. 349/113, 65, 64, 349/62, 112; 359/855

(56) References Cited

U.S. PATENT DOCUMENTS

| 5,733,710 A | | 3/1998 | Kuboya et al. |
| 6,097,458 A | | 8/2000 | Tsuda et al. |
| 6,099,134 A | * | 8/2000 | Taniguchi et al. ............. 362/31 |
| 6,266,111 B1 | * | 7/2001 | Kataoka et al. ............. 349/113 |
| 6,522,375 B1 | * | 2/2003 | Jang et al. ................... 349/113 |

FOREIGN PATENT DOCUMENTS

| EP | 0576303 A1 | 12/1993 |
| KR | 2000-71619 | 11/2000 |

* cited by examiner

Primary Examiner—Robert H. Kim
Assistant Examiner—Thoi V. Duong
(74) Attorney, Agent, or Firm—McDermott Will & Emery LLP

(57) ABSTRACT

In a reflector 101 having a concave/convex shape in a surface thereof, at least part of concave portions 4 of the concave/convex shape are arranged according to a predetermined rule and the concave/convex shape of an arbitrary straight-line cross section is irregular.

12 Claims, 21 Drawing Sheets

1112

1111 acoustic member

1122

1121 electromagnetic wave member 1131 oscillating member 1141 radio wave member

REFLECTION BOARD, REFLECTION TYRE LIQUID CRYSTAL DISPLAY UNIT AND PRODUCTION METHOD THEREFOR, OPTICAL MEMBER, DISPLAY UNIT, ILLUMINATING DEVICE, DISPLAY BOARD, AND UNDULATORY MEMBER

TECHNICAL FIELD

The present invention relates to a light reflector and a fabrication method thereof, a reflective liquid crystal display and a fabrication method thereof, an optical member, a display, an illuminating device, a display panel, and a wave member.

BACKGROUND ART

A reflective display which requires no light source such as a backlight, for example, a reflective liquid crystal display performs display using an ambient light and consumes a small power. Therefore, this display is often used for portable equipment.

To ensure sufficient brightness of the reflective display, a plate-shaped reflector made of metal such as aluminum or silver with high reflectance could be employed. However, if a surface of the reflector is flat, mirror reflection occurs, thereby causing the light source to be mirrored in the reflector, and portion other than the portion of the reflector in which the light source is mirrored is dark because it reflects little light. So, a displayed image of the display is visually undesirable. Accordingly, if numerous minute concave/convex portions are formed on the surface of the metal reflector to allow the light to be diffused by the concave/convex portions, then such mirroring of the light source is suppressed, and a reflector with preferable reflective characteristics is obtained. The reflective liquid crystal display comprising such reflector is disclosed in Japanese Patents Nos. 2698218, 2756206.

By the way, in the reflector having the concave/convex portions on the surface thereof, a direction of the reflected light depends on a shape of the surface. In the reflector having the concave/convex portions, light is diffracted when reflected. For this reason, when the concave/convex portions are repeated at uniform intervals, lights diffracted by the concave/convex portions on the surface of the reflector interfere with one another, thereby causing the intensified light to be reflected in a specific direction or specific wavelengths to interfere with one another and intensify one another, so that the reflector looks colored. FIG. 19 shows an example of arrangement of such concave/convex shape. FIG. 20 shows a cross section taken along line XX—XX of FIG. 19. In FIG. 19, circles represent concave portions. The concave portions are regularly arranged in a lattice. In FIG. 20, the concave/convex shape is provided in a reflecting film 3 formed by utilizing a concave-convex layer 2 on a substrate 1 and the concave/convex portions in its cross section are regularly repeated. In such regular arrangement, the diffracted lights interfere with one another, thereby causing a visually undesirable display. Accordingly, by irregularly arranging the concave/convex portions in a plane in which the reflector is present, the interference of the diffracted lights is suppressed and the reflected light is white-colored. So, a reflector having a preferable reflection characteristic is obtained.

An example of a method for thus suppressing the interference of the diffracted lights is disclosed in Japanese Patent No. 2912176. In this example, the concave/convex portions are irregularly arranged. Specifically, the concave/convex portions are suitably arranged so that a distribution of distance between adjacent concave portions or between adjacent convex portions, or a distribution of height of concave/convex portions has a variation within a predetermined range. As disclosed in the above-described conventional example, the irregular concave/convex arrangement is capable of preventing the interference of the diffracted lights. However, conventionally, since a specific method for designing the concave/convex arrangement has not been clarified but only how the arrangement is irregular has been clarified, designers of the concave/convex arrangement have had to make trial-and-errors so that variations are within a predetermined range. So when a design of a display having pixels arranged in matrix was changed, for example, the pixel arrangement was changed and a reflector adapted to the changed arrangement was newly designed, the concave/convex arrangement varied. Consequently, an inclination angle on the concave/convex surface varied, and it was impossible to design a reflector having a definite reflection characteristic.

This problem is caused by the interference of the diffracted lights. Therefore, this problem arises in any type of wave including light (light wave),a sound wave, an electromagnetic wave, an oscillating wave, etc. The interference of wave occurs when a wave source is two-dimensionally distributed, or there are many portions having extremal values (local maximum value and local minimum value) of radiation intensity of wave in the two-dimensional wave source. Also, the interference occurs in the wave source having a plane on/through/at which the incident wave is reflected/transmitted/refracted or the like. Therefore, the above-described problem exists in these cases like the reflector of light.

DISCLOSURE OF THE INVENTION

The present invention is directed to solving the above-described problem, and an object of the present invention is to provide a reflector and a fabrication method thereof, a reflective liquid crystal display and a fabrication method thereof, an optical member, a display, an illuminating device, a display panel, and a wave member, in which a two-dimensionally shaped wave radiation member capable of suppressing interference of radiated waves and having a definite radiation characteristic.

To achieve the above-described object, according to the present invention, there is provided a reflector having a concave/convex shape in a surface thereof, characterized in that at least part of concave portions or convex portions of the concave/convex shape are arranged according to a predetermined rule, and the concave/convex shape of an arbitrary straight-line cross section is irregular.

With this constitution, since the arrangement of the concave/convex shape is irregular, the interference of the diffracted lights reflected by the reflector can be prevented. Besides, since the arrangement of the concave/convex shape has regularity, a reflection characteristic reproducible in design is obtained.

According to the present invention, a reflector having a concave/convex shape in a surface thereof, is characterized in that at least part of concave portions or convex portions of the concave/convex shape are arranged according to a predetermined rule and concave/convex shapes of arbitrary parallel straight-line cross sections do not have the same regularity.

With this constitution, since the regularity of the arrangement of the concave/convex shape is not repeated in a specific direction, the interference of the diffracted lights reflected by the reflector can be prevented. Besides, since the arrangement of the concave/convex shape has regularity, a reflection characteristic reproducible in design is obtained.

In this case, at least part of the concave portions or the convex portions of the concave/convex shape may be arranged in a substantially spiral shape.

With this constitution, it is possible to easily realize the arrangement in which the concave/convex shapes of arbitrary parallel straight-line cross sections do not have the same regularity.

In this case, the reflector may include the concave portions or the convex portions in which a central angle made between a n-th concave/convex portion and a (n+1)-th concave/convex portion is a multiple of 137.5 degrees when the concave portions or the convex portions are numbered using n according to a distance from a center of the spiral.

With this constitution, it is possible to realize a reflector having the distance between adjacent concave/convex portions made almost equal and having a uniform reflection characteristic.

Also, the reflector may include the concave portions or the convex portions in which a distance from a center of the spiral to a concave/convex portion is proportional to a square root of n when the concave portions or the convex portions are numbered using n according to the distance from the center of the spiral.

Also with this constitution, it is possible to realize a reflector having the distance between adjacent concave/convex portions made almost equal and having a uniform reflection characteristic.

In the above case, at least part of the concave portions or the convex portions of the concave/convex shape may be regularly arranged in a substantially concentric shape. Also, at least part of the concave portions or the convex portions of the concave/convex shape may be arranged in a substantially radial shape. Further, at least part of the concave portions or the convex portions of the concave/convex shape may be arranged in a substantially ellipsoidal spiral shape or in a substantially ellipsoidal radial shape.

With this constitution, the interference of the diffracted lights due to the regularity of the concave/convex arrangement can be prevented.

Also, at least part of the concave portions or the convex portions of the concave/convex shape may be arranged so as to have a positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

With this constitution, it is possible to realize a regular arrangement in which an area in a plane occupied by each concave/convex portion can be made almost equal and the distance between adjacent concave portions or adjacent convex portions can be made almost equal.

Also, more than half of all the concave portions or the convex portions may be arranged according to the predetermined rule.

With this constitution, the arrangement of the concave/convex shape can be easily designed.

The concave portions or the convex portions of the concave/convex shape may be repeatedly arranged in matrix.

The concave portions or the convex portions of the concave/convex shape may be formed through a process including mask exposure and development, the mask exposure using a photomask including light-blocking regions or light-transmitting regions at least part of which are arranged according to a predetermined rule.

With this constitution, a reflector having a preferable characteristic can be fabricated easily and with high reproducibility.

According to the present invention, a reflector in which a plurality of unit regions having a concave/convex shape are formed in a surface thereof, is characterized in that all the unit regions have the same concave/convex shape, at least part of concave portions or convex portions of the concave/convex shape in the unit region are arranged according to a predetermined rule, and concave/convex shapes of arbitrary parallel straight-line cross sections do not have the same regularity.

With this constitution, when the concave/convex shape of a straight-line cross section in a unit region has regularity, the same regularity exists at an arrangement pitch of the unit region, but when the pitch has a certain value or more and is repeated at a low frequency, the interference is slight and therefore unrecognizable in practice. Consequently, an adverse effect caused by the interference can be prevented.

In this case, the unit regions may be formed in matrix in the surface.

This constitution is suitable to the reflector of the reflective image display using pixels.

According to the present invention, there is provided a method for fabricating a reflector having a concave/convex shape in a surface thereof, characterized in that the concave/convex shape is provided such that at least part of concave portions or convex portions are arranged according to a predetermined rule and the concave-convex shape of an arbitrary straight-line cross section is irregular or the same regularity is not repeated in arbitrary parallel straight-line cross sections.

With this constitution, a reflector capable of preventing the interference due to diffraction can be fabricated with high reproducibility.

In this case, the method may comprise: performing a process including mask exposure and development, the mask exposure using a photomask including light-blocking regions or light-transmitting regions arranged such that at least part of the regions are arranged according to a predetermined rule and the regions in an arbitrary straight-line cross section in an arrangement plane are irregular or the regions on arbitrary parallel straight lines do not have the same regularity, to thereby provide a concave/convex shape so as to have the concave portions or the convex portions at positions corresponding to the light-blocking regions or the light-transmitting regions of the photomask on a surface of a substrate; and forming a reflecting film on the surface of the concave/convex shape.

With this constitution the reflector can be easily fabricated using a photolithographic method.

According to the present invention, there is provided a reflective liquid crystal display panel comprising: a liquid crystal layer and a reflector placed substantially in parallel with the liquid crystal layer, in which an ambient light is reflected externally by the reflector through the liquid crystal layer, and the liquid crystal layer can be modulated by an externally applied voltage, characterized in that the reflector has a concave/convex shape in a surface thereof, at least part of concave portions or convex portions of the concave/convex shape are arranged according to a predetermined rule, and the concave/convex shape of an arbitrary straight-line cross section is irregular, or concave/convex shapes of arbitrary parallel straight-line cross sections do not have the same regularity.

With this constitution, it is possible to realize a reflective liquid crystal display panel with preferable visibility and reproducibility in design.

In this case, the reflector may include a reflecting film on a substrate, for reflecting the ambient light, an opposed substrate is placed opposite to the reflector with the liquid crystal layer interposed therebetween, and an electrode for modulating the liquid crystal layer is comprised of the reflecting film and a common electrode formed on an inner surface of the opposed substrate.

With this constitution, since the reflecting film can be employed as the electrode, the constitution can be simplified.

According to the present invention, there is provided a method for fabricating a reflective liquid crystal display panel comprising: performing a process including mask exposure and development, the mask exposure using a photomask including light-blocking regions or light-transmitting regions such that at least part of the regions are arranged according to a predetermined rule and the regions on arbitrary parallel straight lines in an arrangement plane do not have the same regularity or the regions on arbitrary parallel straight lines in an arrangement plane do not have the same regularity, to thereby provide a concave/convex shape so as to have concave portions or convex portions at positions corresponding to the light-blocking regions or the light-transmitting regions on a surface of a substrate; forming a reflecting film on the surface of the concave/convex shape; placing an opposed substrate having a common electrode on an inner surface thereof as being opposed to a surface of the substrate on which the reflecting film is formed; and filling a liquid crystal into a spacing between the substrate and the opposed substrate.

With this constitution, a reflective liquid crystal display panel with preferable visibility and reproducibility in design can be fabricated using the photolithographic method.

According to the present invention, there is provided a reflective liquid crystal display comprising: a reflective liquid crystal display panel including a liquid crystal layer and a reflector placed substantially in parallel with the liquid crystal layer, in which an ambient light is reflected externally by the reflector through the liquid crystal layer, the liquid crystal layer can be modulated by an externally applied voltage, the reflector has a concave/convex shape in a surface thereof, at least part of concave portions or convex portions of the concave/convex shape are arranged according to a predetermined rule, and the concave/convex shape of an arbitrary straight-line cross section is irregular or the concave/convex shapes of arbitrary parallel straight-line cross sections do not have the same regularity; and drive means for driving the reflective liquid crystal display panel by applying a voltage for modulating the liquid crystal layer.

With this constitution, it is possible to realize a reflective liquid crystal display with preferable visibility and reproducibility in design can be provided.

According to the present invention, there is provided an optical member characterized in that an optical characteristic in an observation point direction varies in a plane, and at least part of optical action centers at which the optical characteristic has a local maximum value or a local minimum value are arranged in the plane according to a predetermined rule and the optical action centers on an arbitrary straight line in the plane are arranged irregularly.

With this constitution, since the optical action centers are irregularly arranged, the interference of the diffracted lights subjected to optical action can be prevented. Besides, since the arrangements of the optical action centers has regularity, an optical characteristic reproducible in design is obtained.

According to the present invention, there is provided an optical member characterized in that an optical characteristic in an observation point direction varies in a plane, and at least part of optical action centers at which the optical characteristic has a local maximum value or a local minimum value are arranged in the plane according to a predetermined rule, and the optical action centers on arbitrary parallel straight lines in the plane do not have the same regularity.

With this constitution, since the regularity of the arrangement of the optical action centers is not repeated in a specific direction, the interference of the diffracted lights subjected to the optical action can be prevented. Besides, since the arrangement of the optical action centers have regularity, an optical characteristic reproducible in design can be obtained.

Also, the optical characteristic may vary substantially discontinuously at a boundary between a minute region having the optical action center as a center and the other region, and may have substantially the same value in each region.

Also, at least part of the optical action centers may be arranged in a substantially spiral shape.

With this constitution, it is possible to easily realize the arrangement in which the optical action centers of arbitrary parallel straight-line cross sections do not have the same regularity.

In this case, the optical member may include the optical action centers in which a central angle made between a n-th optical action center and a (n+1)-th optical action center is a multiple of 137.5 degrees when the optical action centers are numbered using n according to the distance from the center of the spiral. Also, the optical member may further include the optical action centers in which the distance from the center of the spiral to an optical action center is proportional to a square root of n when the optical action centers are numbered using n according to the distance from the center of the spiral.

With this constitution, it is possible to realize an optical member having the distance between adjacent optical actions centers made almost equal and having a uniform optical characteristic.

In this case, at least part of the optical action centers may be regularly arranged in a substantially concentric shape. Also, at least part of the optical action centers may be arranged in a substantially radial shape. Further, at least part of the optical action centers may be arranged in a substantially ellipsoidal spiral shape or in a substantially ellipsoidal radial shape.

With this constitution, the interference of the diffracted lights due to the regularity of the arrangement of the optical action centers can be prevented.

Also, at least part of the optical action centers maybe arranged so as to have positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

With this constitution, it is possible to realize a regular arrangement in which an area in a plane occupied by each action center can be made almost equal and a distance between adjacent optical action centers can be made almost equal.

Also, at least part of the optical action centers may be arranged so as to have positional relationship similar to arrangement obtained by symmetric transformation of a plurality of points regularly arranged in a concentric shape on the arbitrary two-dimensional coordinate system.

The optical action centers may be repeatedly arranged in matrix.

The optical characteristic may be a reflectance.

With this constitution, it is possible to realize a reflective member capable of preventing the interference of the diffracted lights and having a reflection characteristic with preferable design reproducibility.

The optical characteristic may be a refractive index.

With this constitution, it is possible to realize a refractive member capable of preventing the interference of the diffracted lights and having a refractive characteristic with preferable design reproducibility.

The optical characteristic may be a transmittance.

With this constitution, it is possible to realize a light-transmitting member capable of preventing the interference of the diffracted lights and having a transmission characteristic with preferable design reproducibility.

According to the present invention, there is provided an optical member characterized in that an optical characteristic in an observation point direction varies for each plural unit regions in a plane, the optical characteristic is the same in all the unit regions, at least part of optical action centers at which the optical characteristic in a unit region has a local maximum value or a local minimum value are arranged in the plane according to a predetermined rule and arrangements of the optical action centers on arbitrary parallel straight lines in the plane of the unit region do not have the same regularity.

With this constitution, when the optical action centers on a straight line in a plane of a unit region has regularity, the same regularity exists at an arrangement pitch of the unit region, but when the pitch has a certain value or more and is repeated at a low frequency, the interference is slight and therefore unrecognizable in practice. Consequently, an adverse effect caused by the interference can be prevented.

In this case, the unit regions may be formed in matrix in the plane.

According to the present invention, there is provided a display comprising: display means for displaying predetermined information; and an optical member placed on a light path of light for displaying the information, in which an optical characteristic in a direction in which displayed information is observed varies in a plane, at least part of optical action centers at which the optical characteristic has a local maximum value or a local minimum value are arranged in the plane according to a predetermined rule, and the optical action centers on an arbitrary line in the plane are irregularly arranged or the optical action centers on arbitrary parallel straight lines do not have the same regularity.

With this constitution, a display with preferable visibility and design reproducibility can be provided.

According to the present invention, there is provided an illuminating device comprising: light emitting means for emitting light; and an optical member placed on a light path of the emitted light, in which an optical characteristic in a direction in which displayed information is observed varies in a plane, at least part of optical action centers at which the optical characteristic has a local maximum value or a local minimum value are arranged in the plane according to a predetermined rule, and the optical action centers on an arbitrary straight line in the plane are arranged irregularly or arrangements of the optical action centers on arbitrary parallel straight lines do not have the same regularity.

With this constitution, an illuminating device with preferable visibility and design reproducibility can be provided.

According to the present invention, there is provided a display panel comprising: light emitting means for emitting light; and an optical member placed on a light path of the emitted light, in which an optical characteristic in a direction in which displayed information is observed varies in a plane, at least part of optical action centers at which the optical characteristic has a local maximum value or a local minimum value are arranged in the plane according to a predetermined rule, and the optical action centers on an arbitrary straight line in the plane are arranged irregularly, or arrangements of the optical action centers on arbitrary parallel straight lines do not have the same regularity, and the optical action centers are distributed in a predetermined display pattern.

With this constitution, a display panel with preferable visibility and design reproducibility can be provided.

According to the present invention, there is provided a wave member characterized in that a radiation characteristic of a wave varies in a plane, at least part of wave action centers at which the radiation characteristic has a local maximum value or a local minimum value are arranged in the plane according to a predetermined rule, and the wave action centers on an arbitrary straight line in the plane are irregularly arranged.

With this constitution, it is possible to realize a wave member capable of preventing the interference of radiated waves due to diffraction and having a wave radiation characteristic with preferable design reproducibility.

According to the present invention, there is provided a wave member characterized in that a radiation characteristic of a wave varies in a plane, at least part of wave action centers at which the radiation characteristic has a local maximum value or a local minimum value are arranged in the plane according to a predetermined rule, and arrangements of the wave action centers on arbitrary parallel straight lines in the plane do not have the same regularity.

Also with this constitution, it is possible to realize a wave member capable of preventing the interference of radiated waves due to diffraction and having a wave radiation characteristic with preferable design reproducibility.

The radiation characteristic may vary substantially discontinuously at a boundary between a minute region having the wave action center as a center and the other region, and has substantially the same value in each region.

Also, at least part of the wave action centers may be regularly arranged in a concentric shape.

With this constitution, the interference of the wave due to the regularity of the arrangement of the wave action centers can be prevented.

The wave may be a sound wave, and the wave member may constitute an acoustic member.

With this constitution, an acoustic member with preferable sound radiation characteristic and design reproducibility can be provided.

The wave may be an electromagnetic wave, and the wave member may constitute an electromagnetic wave member.

With this constitution, an electromagnetic wave member with preferable electromagnetic wave radiation characteristic and design reproducibility can be provided.

The wave may be an oscillation and the wave member may constitute an oscillating member.

With this constitution, an oscillating member with preferable oscillation radiation characteristic and design reproducibility can be provided.

The wave may be a radio wave and the wave member may constitute a radio wave member.

With this constitution, a radio wave member with preferable radio wave radiation characteristic and design reproducibility can be provided.

The above and further objects and features of the invention will more fully be apparent from the following detailed description with accompanying drawings.

BRIEF DESCRIPTION OF THE DRAWINGS

FIG. 11 is a cross-sectional view taken along line XI—XI of FIG. 9;

FIG. 12 is a plan view showing a structure of a reflector according to a fourth embodiment of the present invention;

BEST MODE FOR CARRYING OUT THE INVENTION

Hereinafter, embodiments of the present invention will be described with reference to Figures.

First Embodiment

Reflector

Figure 1:
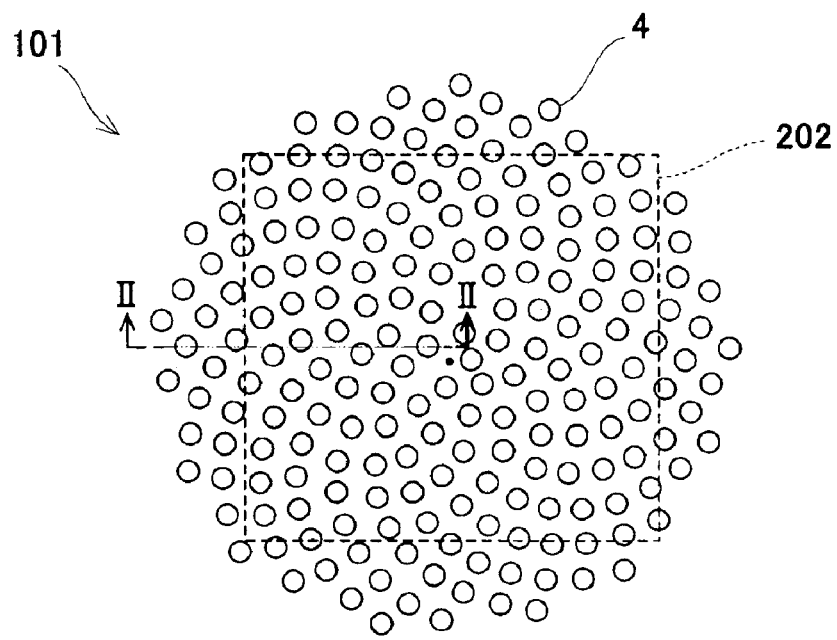
FIG. 1 is a plan view showing a structure of a reflector according to a first embodiment of the present invention.
Figure 2:
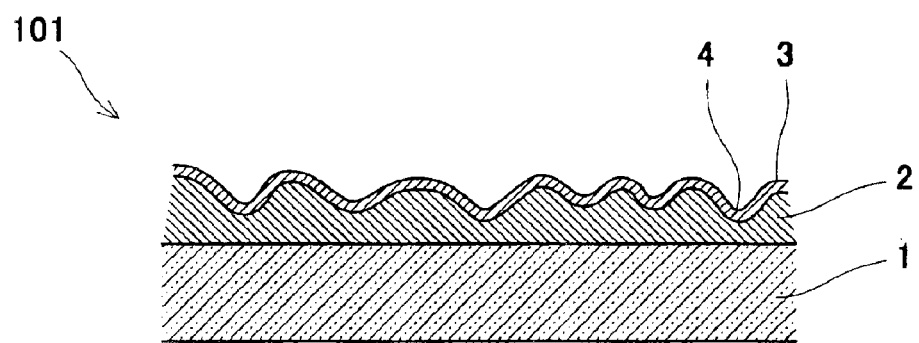
FIG. 2 is a cross-sectional view taken along line II—II of FIG. 1.

FIG. 1 is a plan view showing a structure of a reflector according to a first embodiment of the present invention. FIG. 2 is a cross-sectional view taken along line II—II of FIG. 1.

As shown in FIG. 2, a plate-shaped reflector 101 is structured such that a concave/convex layer 2 is formed on a flat substrate 1 and a reflecting film 3 is formed on the concave/convex layer 2. Therefore, the reflecting film 3 has a concave/convex shape conforming to a concave/convex shape of a surface of the concave/convex layer 2 and a surface of the reflecting film 3 is a surface of the reflector 101.

The concave/convex layer 2 is made of photosensitive resin. After removal of a portion of the concave/convex layer 2 in which concave portions are to be formed by a photolithographic method, the photosensitive resin is subjected to melt flow to provide a smooth concave/convex shape on a surface thereof. The reflecting film 3 is comprised of a metal film with high reflectance. Herein, the reflecting film 3 is comprised of a 0.2 μm aluminum film. Other than aluminum, the reflecting film 3 may be made of metal with high reflectance such as silver.

In FIG. 1, concave portions 4 of the concave/convex shape of the reflecting film 3 are represented by circles. As shown in FIG. 1, the concave portions 4 are arranged on a substantially spiral locus around a predetermined point C on a main surface of the substrate 1. This arrangement will be described later in detail. In the reflector 101, the concave portions 4 on the surface thereof are arranged according to a predetermined rule, while the surface shape of an arbitrary straight line cross section is irregular as shown in FIG. 2.

In the reflector 101 so structured, when an ambient light is incident thereon, the light is reflected on the surface of the reflecting film 3. Since the surface shape of the arbitrary straight-line cross section of the reflecting film 3 is irregular, interference due to diffraction of the reflected light is prevented and the reflected light is white-colored. Thus, a preferable reflection characteristic is obtained. Also, since the concave portions 4 of the reflecting film 3 are arranged according to the predetermined rule, the concave portions 4 are arranged according to the rule when design is changed or the like. Therefore, the reflector 101 having a definite reflection characteristic is obtained. This effect will be described in detail later.

Liquid Crystal Display Panel

Figure 3:
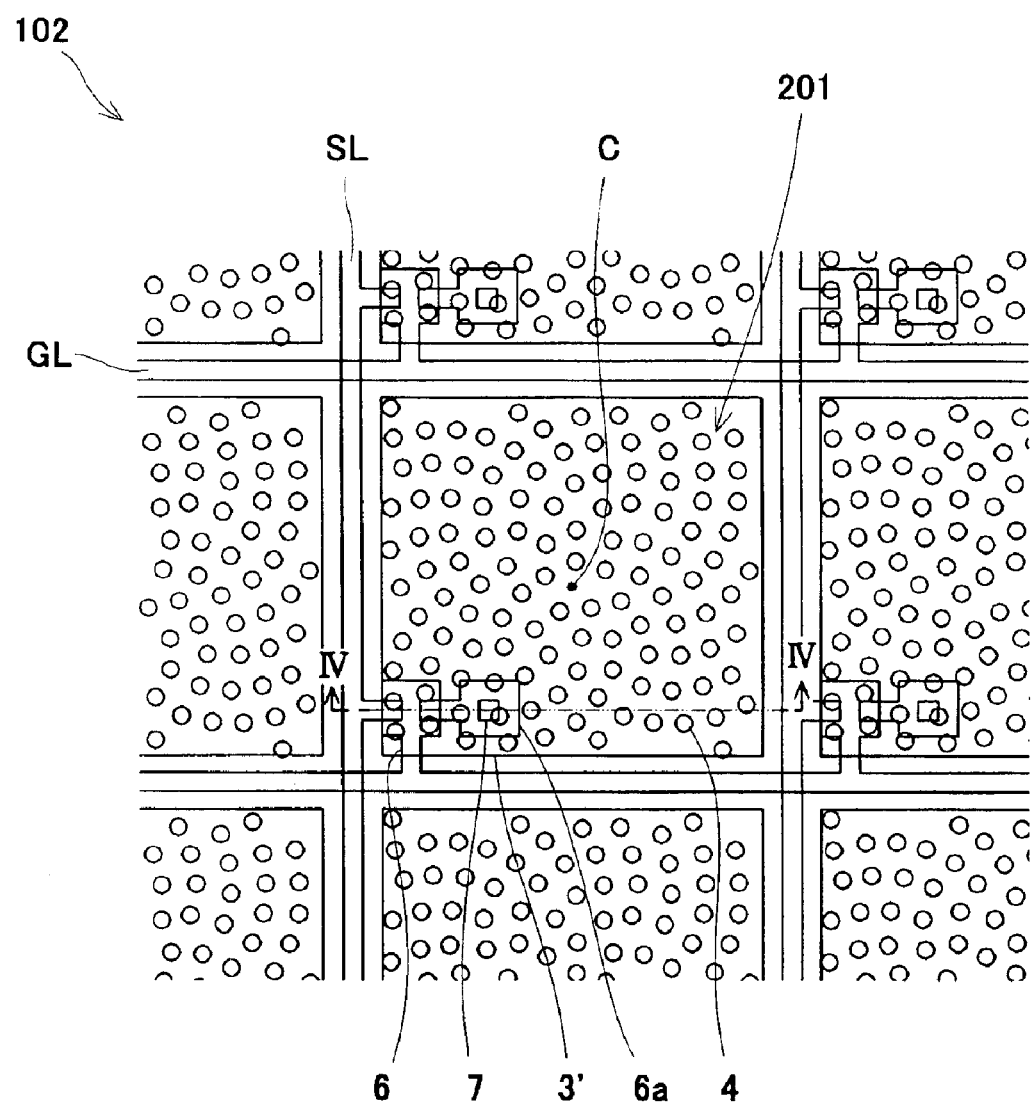
FIG. 3 is a plan view showing a structure of a reflective liquid crystal display panel according to the first embodiment of the present invention.
Figure 4:
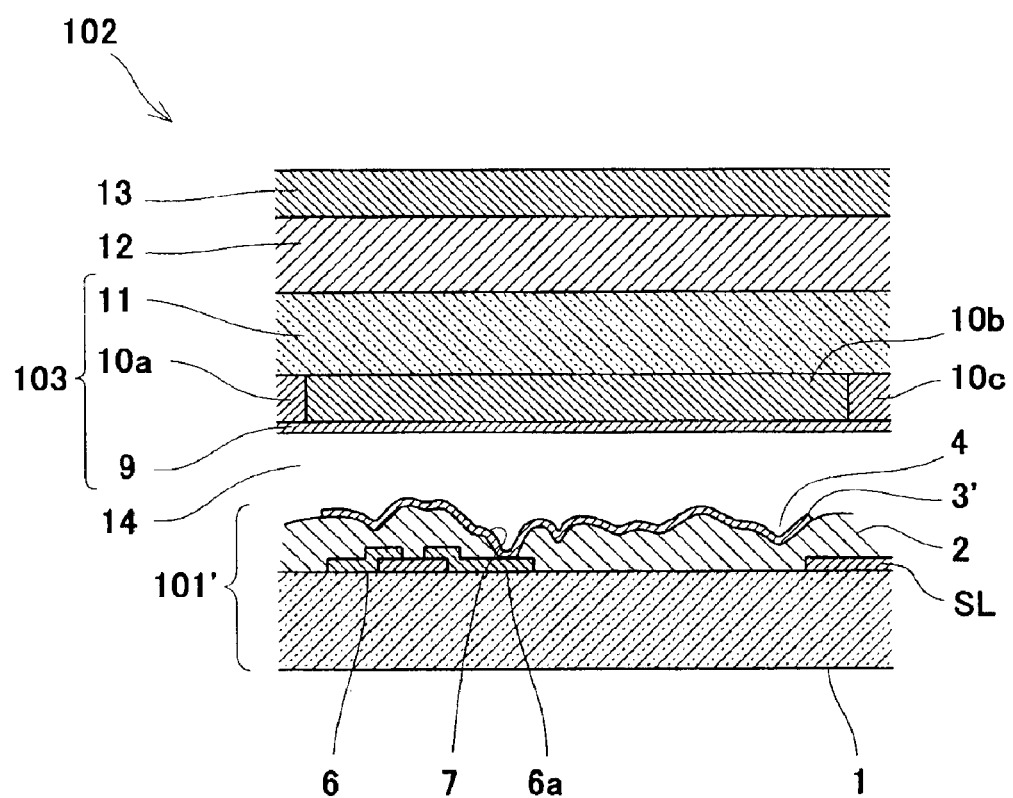
FIG. 4 is a cross-sectional view taken along line IV—IV of FIG. 2.

FIG. 3 is a plan view showing a structure of a reflective liquid crystal display panel according to this embodiment of the present invention. FIG. 4 is a cross-sectional view taken along line IV—IV of FIG. 3. In FIG. 3, the liquid crystal display panel is perspectively shown.

As shown in FIGS. 3, 4, a reflective liquid crystal display panel (hereinafter simply referred to as a liquid crystal display panel) 102 is structured such that a liquid crystal 14 is interposed between a reflector 101' and an opposed substrate (color filter substrate) 103 placed as having a predetermined spacing between them and being opposite to each other, and a retardation film 12 and a polarizer 13 are provided on an outer surface of the opposed substrate 103 in this order.

The reflector 101' is a reflector according to this embodiment. Herein, the reflector 101' is structured such that source lines SL, gate lines GL, and switching elements 6 connected to these are formed on a substrate 1 made of no-alkali glass and a concave/convex layer 2 and a reflecting film (hereinafter referred to as a pixel reflecting film) 3' are formed on the substrate 1 having the source lines SL, the gate lines GL, and the switching elements 6. The source lines SL and the gate lines GL are formed in matrix on the substrate 1, and a region defined by the source lines SL and the gate lines GL constitutes a pixel 201. The switching element 6 is provided for each pixel 201. The switching element 6 is comprised of a TFT (Thin Film Transistor). The pixel reflecting film 3' is defined for each pixel 201 and connected to a terminal 6a of the switching element 6 through a contact hole 7 formed through the concave/convex layer 2. In other words, the pixel reflecting film 3' is provided for each pixel and constitutes a pixel electrode as well as a metal reflection is layer of the reflector 101'. As can be clearly shown from FIG. 3, the pixel reflecting film 3' is structured to have the concave portions 4 arranged in a substantially spiral shape around the predetermined point C in each pixel.

The opposed substrate 103 is structured such that a color filter 10 and a common electrode 9 comprised of a transparent electrode are formed in this order on an inner surface of the substrate 11 made of no-alkali glass. Reference numerals 10a, 10b, 10c respectively denote regions of elementary colors of R(red), G(green), and B(blue).

An operation of the liquid crystal display panel 102 so structured will be explained. In this liquid crystal display panel 102, an ambient light is incident from the side of the polarizer 13, and sequentially passes through the polarizer 13, the retardation film 12, the substrate 11, the color filter 10, the common electrode 9, and the liquid crystal 4, and is reflected on the surface of the pixel reflecting film 3'. Then, the light passes through the respective members in the reversed order and emanates from the polarizer 13 to the outside. Meanwhile, a gate signal input to the gate line GL causes the switching element 6 of each pixel 201 to be sequentially turned on, and at timing according to this operation, a video signal is sequentially input from the source line SL to the pixel reflecting film 3' of each pixel 201. Thereby, across the pixel reflecting film 3' and the common electrode 9, the voltage according to the corresponding video signal is applied, and according to the voltage, a reflectance of the ambient light in each pixel 201 varies. As a result, a user observing the liquid crystal display panel 102 sees a video image according to the video signal. In this case, since the ambient light is diffused by the pixel reflecting film 3', preferable visibility is obtained.

Method for Designing Reflector

Figure 5:
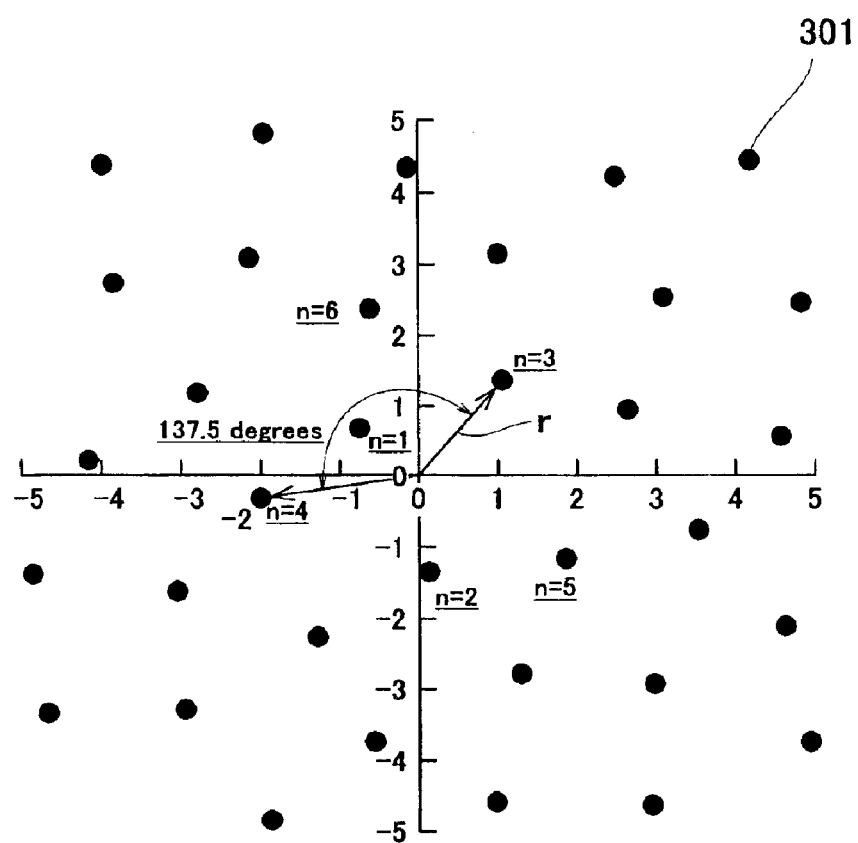
FIG. 5 is a view showing arrangement of concave portions of reflectors of FIGS. 1, 3 according to a rule.

As mentioned previously, the concave portions 4 of the reflector 101 of FIG. 1 and the concave portions 4 of the reflector 101' of FIG. 3 are arranged in the substantially spiral shape around the predetermined point C and regularly in the direction away from the point C, which arrangement is substantially concentric. FIG. 5 shows the arrangement according to this rule. In FIG. 5, positions of many points 301 are represented by two-dimensional coordinates (polar coordinates). Each of the points 301 is located in such a manner that, assuming that n is a natural number, a radius r from the origin as a center on a two-dimensional coordinate system is proportional to a square root of n and a phase angle θ is 137.5 degrees×n. In FIG. 5, numbers are represented as n=1–6. More specifically, when A is a proportionality factor, the first point is expressed as r=A×√1=A (μm), θ=137.5 (degrees), the second point is expressed as r=A×√2 (μm), θ=2×137.5 (degrees), and the n-th point is expressed as r=A×√n (μm), θ=n×137.5 (degrees). The arrangement of FIG. 5 is a arrangement in a natural world such as arrangement of seeds of a sunflower.

An angle of 137.5 degrees is mathematically derived from a theory called Fibonacci number, and with this angle, a regular arrangement in which a spacing between adjacent points 301 is almost equal can be obtained. Also, since the distance from the center is proportional to the square root of n, an area occupied by each point 301 on the two-dimensional coordinate system is made almost equal when the points 301 are sequentially arranged from the center to periphery, and the spacing between the adjacent points 301 is made almost equal.

The concave/convex arrangement of the pixel reflecting film 3' of the liquid crystal display panel 102 is identical to the concave/convex arrangement in the area 202 of FIG. 1, and is obtained by extracting a plurality of points arranged by the method of FIG. 5 and applying the corresponding similar arrangement to the region of the pixel 201. From these facts, the concave/convex arrangement of the reflector 101 of FIG. 1 and the concave/convex arrangement of the reflector 101' of FIG. 3 are the arrangement in which, when the concave portions 4 are numbered using n according to the distance from the center c of the spiral, a central angle made between the n-th concave portion 4 and the (n+1)-th concave portion 4 is a multiple of 137.5 degrees and the distance from the center of the spiral to the concave portion 4 is proportional to the square root of the n.

Inventors discovered that, as shown in FIGS. 2, 4, when the concave/convex portions are arranged regularly by this method, an irregular surface shape into which various shapes are combined rather than the shape in which the same concave/convex portions are repeated, can be provided in arbitrary straight-line cross sections of the reflectors 101, 101'. In the reflector 101 with the arbitrary straight-line cross section having the irregular surface shape and the liquid crystal display panel 102, interference and intensification of the reflected lights diffracted due to the concave/convex portions do not occur. Consequently, the interference is prevented.

When the proportionality constant A is A=1 ($\mu$m), the spacing between adjacent concave portions is approximately 1.9 ($\mu$m). By arbitrarily varying the value for the proportionality constant A, the spacing between the adjacent concave portions can be arbitrarily designed. As should be understood from the foregoing, the concave/convex arrangement can be determined by simple calculations.

When the concave/convex portions are arranged in the pixel 201 in the manner described above, in some cases, the concave portion is located over the boundary in the vicinity of the boundary between the region in the pixel 201 and a region around the pixel 201. In the example of the liquid crystal display panel 102 of FIG. 3, the concave portion is not located over the boundary of the pixel 201 in principle. Instead, the concave portion may be located over the boundary.

Figure 14:
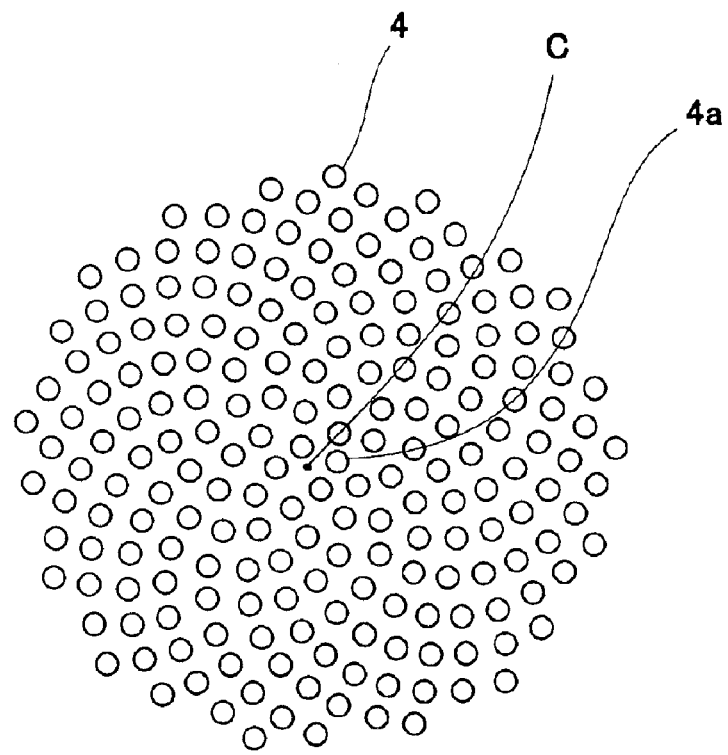
FIG. 14 is a plan view showing a modification of arrangement of concave portions of the reflector according to the first embodiment of the present invention.

All of the concave portions 4 are not necessarily arranged according to the above-identified rule. In addition to the arrangement of the concave portions 4 according to the rule, the concave portions 4 may be arranged at arbitrary points in non-conformity with the rule. The arrangement of FIG. 14 is obtained in such a manner that, based on the arrangement of FIG. 1, a concave portion 4a in non-conformity with the rule is added in the vicinity of the point C in which the concave portions 4 are scarce. Thus, the concave portions 4a in non-conformity with the arrangement of concave portions 4 according to the rule may be added and the regularly arranged concave portions 4 and the arbitrarily arranged concave portions 4a may coexist. Also in this case, it is preferable that the regularly arranged concave portions 4 are more than the arbitrarily arranged concave portions 4a, and the arrangement of the concave portions is designed so that at least half of all the concave portions are regularly arranged.

Figure 15:
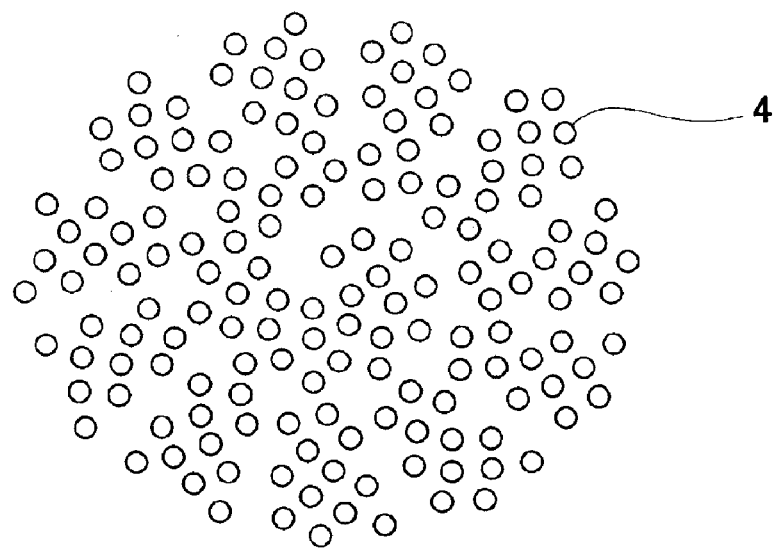
FIG. 15 is a plan view showing another modification of arrangement of the concave portions of the reflector according to the first embodiment of the present invention.

Also, the arrangement of the concave portions may be designed so that, based on the regular arrangement, the number of the concave portions may be reduced by skipping the concave portions. The arrangement of FIG. 15 is obtained by removing several concave portions from the arrangement of FIG. 1. Even if the number of the concave portions is reduced, the reflector with interference suppressed can be designed likewise.

Figure 16:
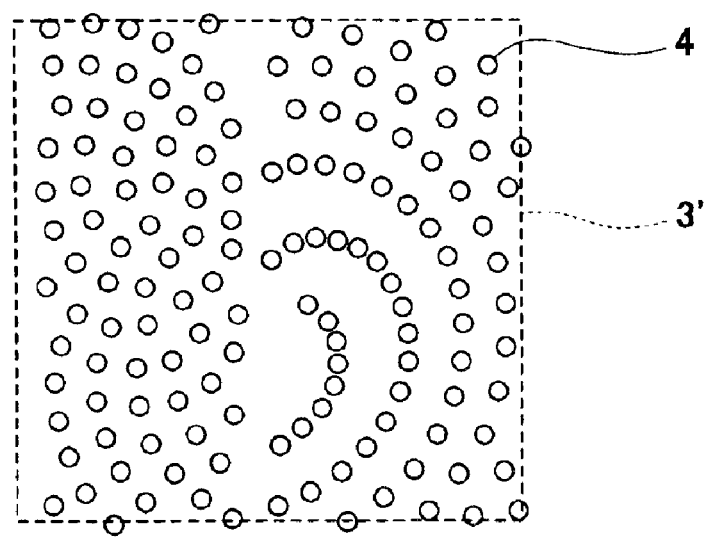
FIG. 16 is a plan view showing a modification of arrangement of concave portions of a pixel reflector of the reflective liquid crystal display according to the first embodiment of the present invention.

While in the liquid crystal display panel 102, one arrangement according to a rule (hereinafter referred to as regular arrangement) is applied to one pixel reflecting film 3', two or more regular arrangements may be combined to form one pixel reflecting film 3'. FIG. 16 shows arrangement of the concave portions in a region corresponding to the pixel reflecting film 3' of FIG. 3, and different arrangements are made on the right and left sides of the pixel reflecting film 3'. Thereby, the similar effects can be obtained.

Figure 17:
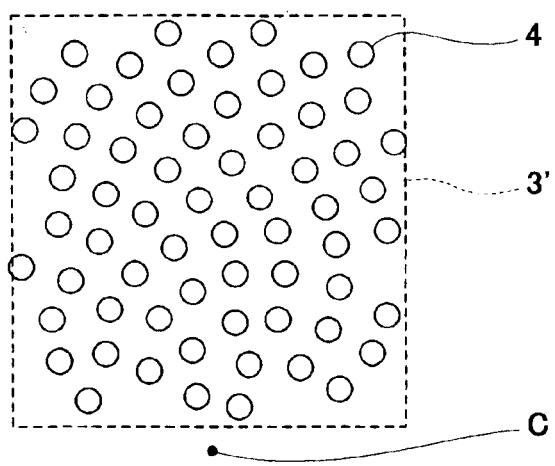
FIG. 17 is a plan view showing another modification of arrangement of the concave portions of the pixel reflector of the reflective liquid crystal display according to the first embodiment of the present invention.

The center of the spiral is not necessarily located in the region in which the concave/convex portions are arranged. As shown in FIG. 17, the center C of the spiral may be located outside the region (in these Figures, region corresponding to the pixel reflecting film 3') in which the concave portions 4 are arranged.

Figure 18:
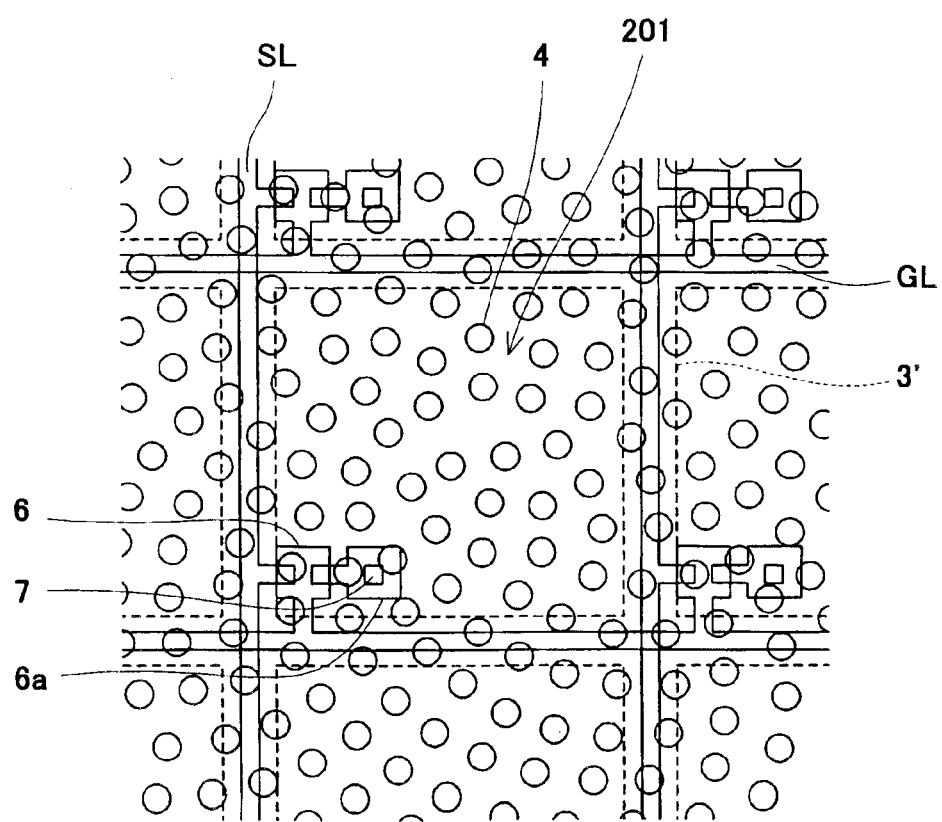
FIG. 18 is a plan view showing a further modification of arrangement of the concave portions of the pixel reflector of the reflective liquid crystal display according to the first embodiment of the present invention.

While in the above-described example, the concave/convex arrangement is applied to one pixel reflecting film 3', as shown in FIG. 18, arrangement according to one rule may be applied to a plurality of pixel reflecting films 3'. For example, all the pixel reflecting films 3' of the liquid crystal display panel may have a spiral arrangement having one center.

While the shape of the concave portions is a circle in the above-described example, it may be an arbitrary polygon such as an arbitrary triangle including a regular triangle and isosceles triangle, or an arbitrary quadangle including a rectangle, a square, and trapezoid. Similarly, an arbitrary pentagon, hexagon, or a polygon with more angles may be adopted.

It is preferable that many inclination angles of the surface of the concave/convex shape with respect to the plane in which the reflector is present are distributed in the range of about 5–10 degrees. The number of the concave portions or the convex portions is preferably 10 or more. Specifically, the number of the concave portions or the convex portions is preferably 10–300. The diameter of the concave portions or the convex portions is preferably 5–50 $\mu$m.

Method for Fabricating Reflector and Liquid Crystal Display Panel

FIGS. 6(a)–6(d) are cross-sectional views showing steps of a method for fabricating a reflector according to this embodiment.

Figure 6:
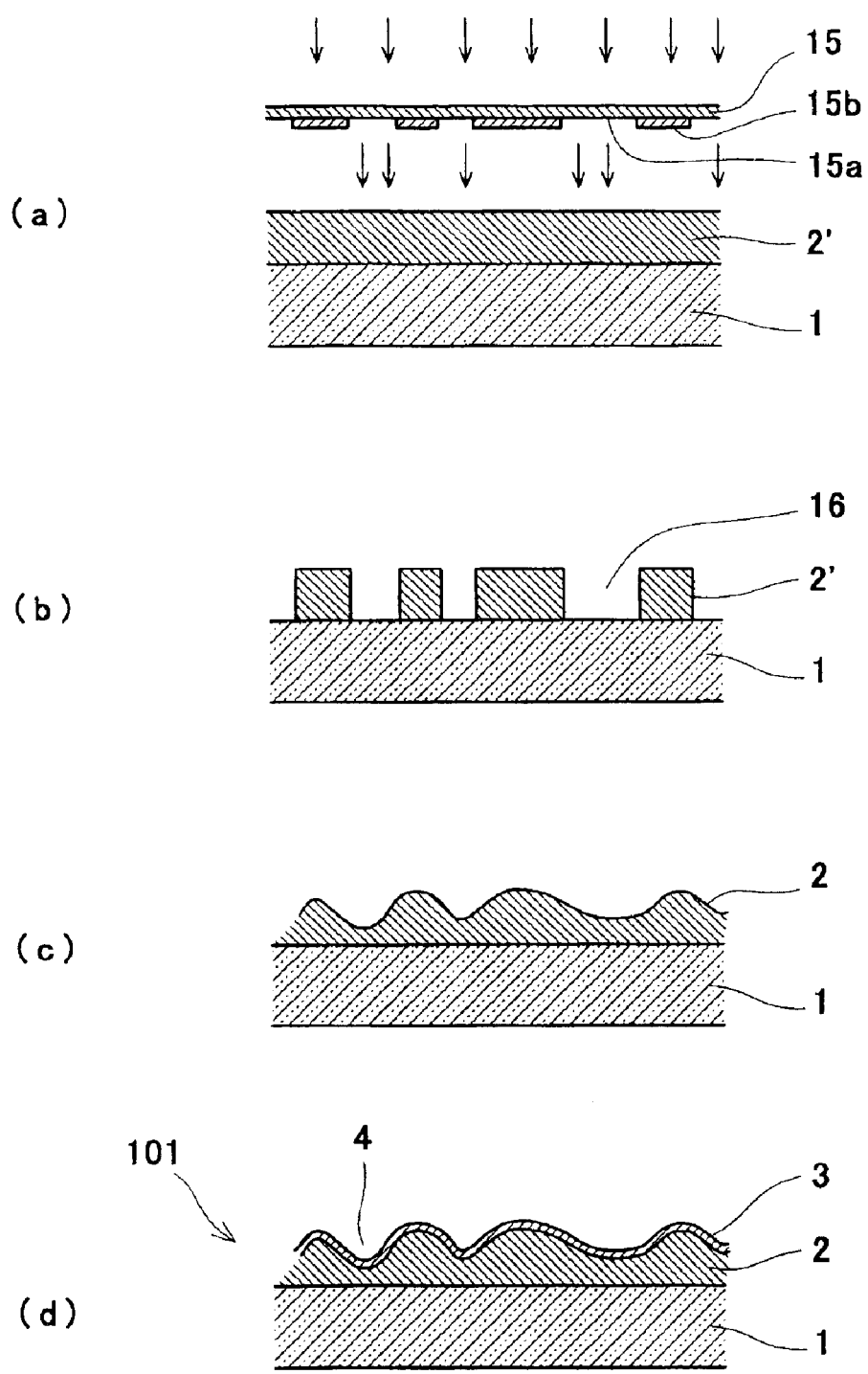
FIGS. 6(a)—6(d) are cross-sectional views showing steps of a method for fabricating the reflector of FIG. 1.

In fabrication of the reflector, as shown in FIG. 6(a), initially, a photosensitive material 2' comprising a positive photosensitive material is applied so as to be 2.0 $\mu$m thick on the substrate 1. Then, mask exposure is carried out by using a photomask 15 having light-transmitting regions 15a corresponding to the concave portions and light-blocking regions 15b corresponding to the other portions, thereby making the portions of the photosensitive material 2' corresponding to the light-emitting regions 15a photosensitive.

Then, as shown in FIG. 6(b), the mask-exposed substrate 1 is developed to thereby form openings 16 in the photosensitive portion of the photosensitive material 2'.

Then, the substrate 1 having the openings 16 is subjected to heat treatment at a glass transition temperature of the photosensitive material 2' before curing, to cause the photosensitive material 2' to melt-flow so as to have surface rounded and the openings 16 to be filled, thereby forming the concave/convex layer 2 having concave/convex portions on the surface as shown in FIG. 6(C). Here, the "melt flow" refers to a characteristic or a phenomenon in which the shape varies, for example, a film is softened by heating, so that the surface of the film is rounded or the film is fluidized on the substrate.

Then, the substrate 1 having the concave/convex layer 2 is sintered at a curing temperature of the photosensitive material to cause the concave/convex layer 2 to be cured.

Then, the reflecting film 3 made of a metal with high reflectance is formed as having a predetermined thickness on the concave/convex layer 2, thereby obtaining the reflector 101.

Subsequently, the method for fabricating the liquid crystal display panel according to this embodiment will be described with reference to FIG. 4. In fabrication of a liquid crystal display panel 102, initially, the source lines SL, the gate lines GL, and the switching elements 6 are formed on the glass substrate 1 by the well-known photolithographic method. Then, the concave/convex layer 2 is formed on the substrate 1 having the source lines SL, the gate lines GL, and the switching elements 6 in the manner described above. Thereafter, a metal film with high reflectance is formed on the concave/convex layer 2 and etched using a photoresist as a mask to form the reflecting film 3' defined for each pixel 201 and a contact hole 7 in an unfilled portion of the opening in the concave/convex layer 2. Thereby, the reflector 101' is obtained.

By the well-known photolithographic method, the color filter 10 and the common electrode 9 are sequentially formed on the glass substrate 11, thereby obtaining the opposed substrate 103.

Then, the reflector 101' and the substrate 103 are bonded as having a predetermined clearance, and the liquid crystal 14 is filled into the clearance to be sealed. Then, the retardation film 12 and the polalizer 13 are sequentially bonded to the outer side of the opposed substrate 103. Thereby, the liquid crystal display panel 102 is obtained.

In the above-described method for fabricating the reflector 101 and the liquid crystal display panel 102, the concave/convex portions can be easily formed on the surfaces of the reflectors 101, 101' by the photolithographic method using melt flow.

In the photomask 15 used herein, according to the above-described concave-convex arrangement, the light-transmitting regions 15a having a predetermined diameter are formed in the portions corresponding to the concave portions and the light-blocking regions 15b are formed in the other portions. This enabled the concave portions 4 to be formed at positions similar to the light-transmitting regions of the photomask 15 on the surfaces of the reflectors 101, 101'. When the negative photosensitive material is used as the material to be made into the concave/convex layer 2, a photomask with the light-transmitting regions and the light-blocking regions reversed may be employed.

Thus, in the photolithogoraphic method, since the concave/convex arrangement is determined depending on a mask pattern of the photomask 15 in exposure, the design of the photomask 15 is the most important factor in determination of a reflection characteristic of the reflectors 101, 101'. In this embodiment, the photomask 15 that determines the reflection characteristic of the reflectors 101, 101' is designed to have regular arrangement. Thereby, without altering this arrangement in design change of the photomask, the reflector with a definite reflection characteristic can be easily designed.

Second Embodiment

Figure 7:
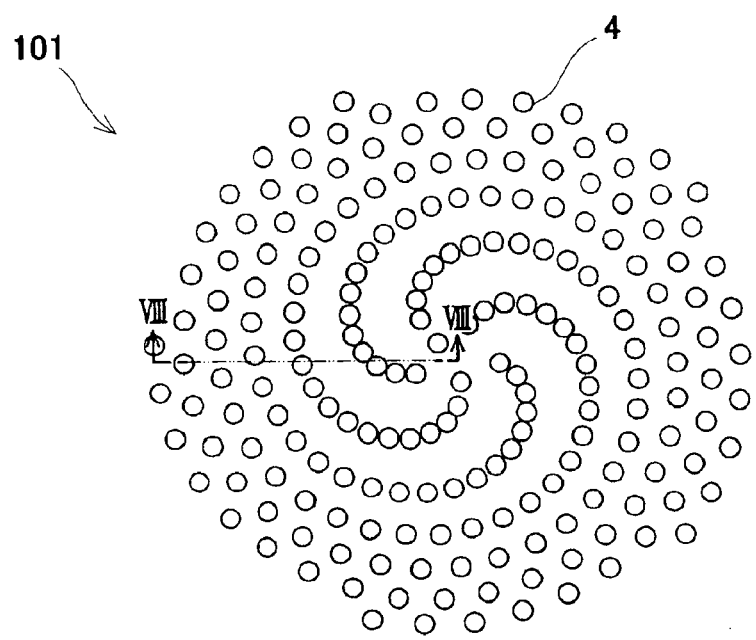
FIG. 7 is a plan view showing a structure of a reflector according to a second embodiment of the present invention.
Figure 8:
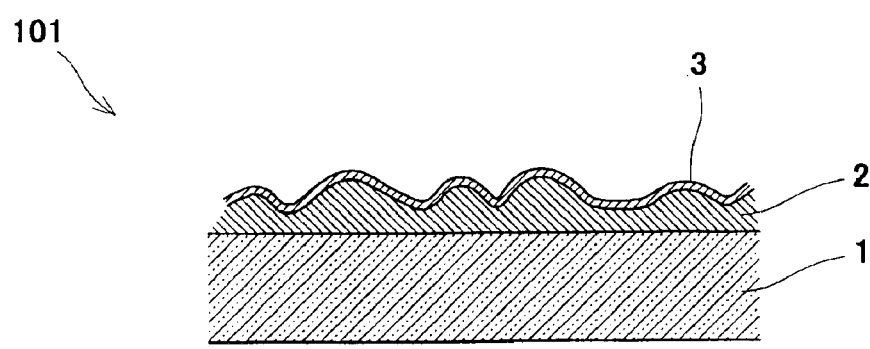
FIG. 8 is a cross-sectional view taken along line VIII—VIII of FIG. 7.

A second embodiment of the present invention illustrates an example in which an arrangement angle of the concave portions in the substantially spiral arrangement is changed. Specifically, in the first embodiment, the concave portions 4 are arranged at angles of multiples of 137.5 degrees. In stead of 137.5 degrees, an arbitrary angle may be set to design the concave/convex arrangement. FIG. 7 shows a case where this angle is set to 142 degrees. FIG. 8 shows the cross section taken along line VIII—VIII of FIG. 7. In this case, the concave portions 4 of the reflector 101 are arranged in substantially spiral shape, and the surface shape of an arbitrary straight-line cross section provides concave/convex portion of different shapes. For this reason, the interference of the reflected light does not occur, and the same effects as provided by the first embodiment can be obtained.

Third Embodiment

Figure 9:
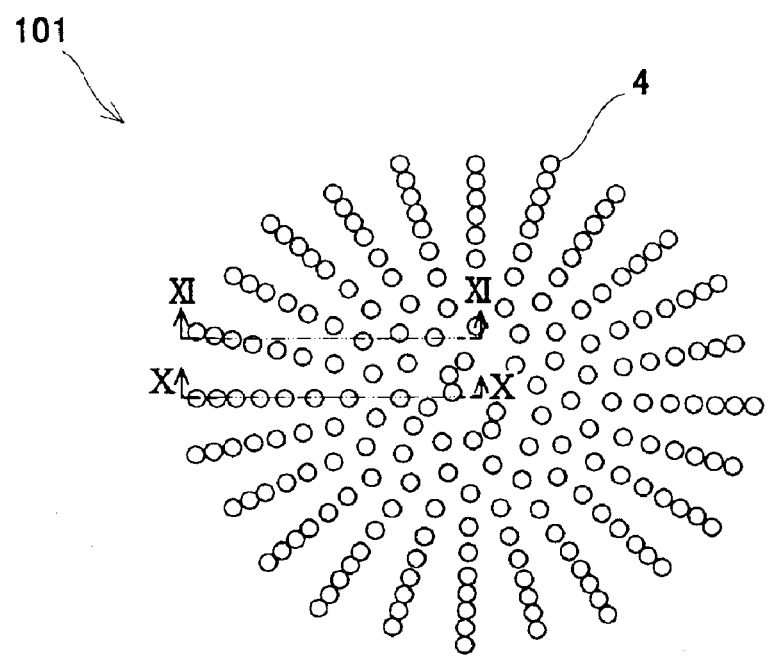
FIG. 9 is a plan view showing a structure of a reflector according to a third embodiment of the present invention.
Figure 10:
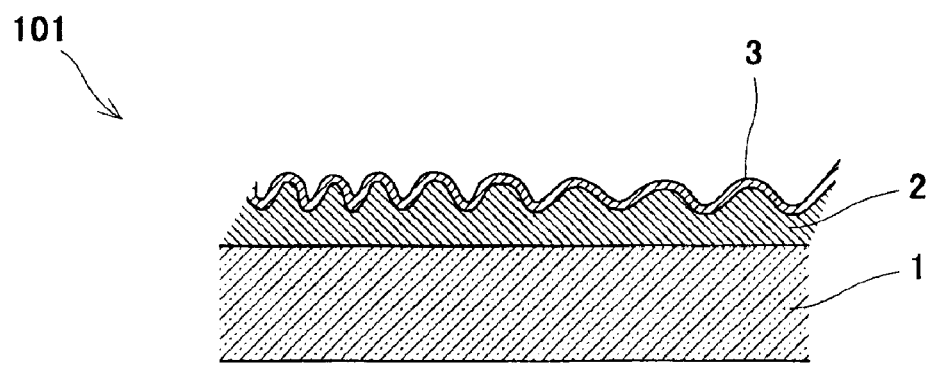
FIG. 10 is a cross-sectional view taken along line X—X of FIG. 9.
Figure 1:
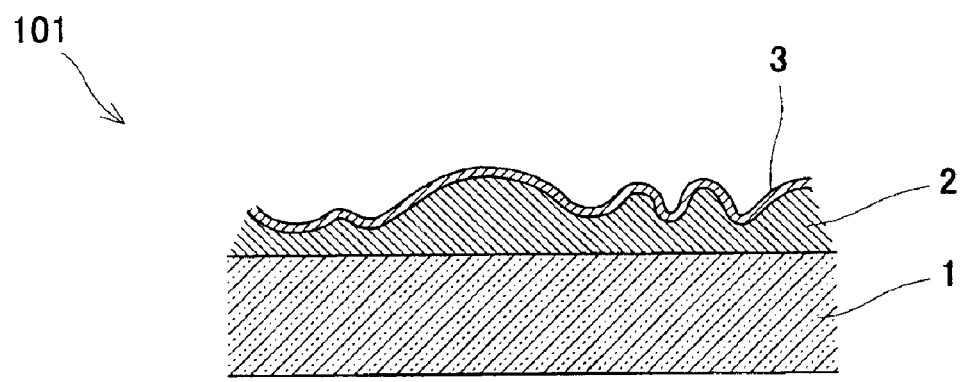
Figure 1:
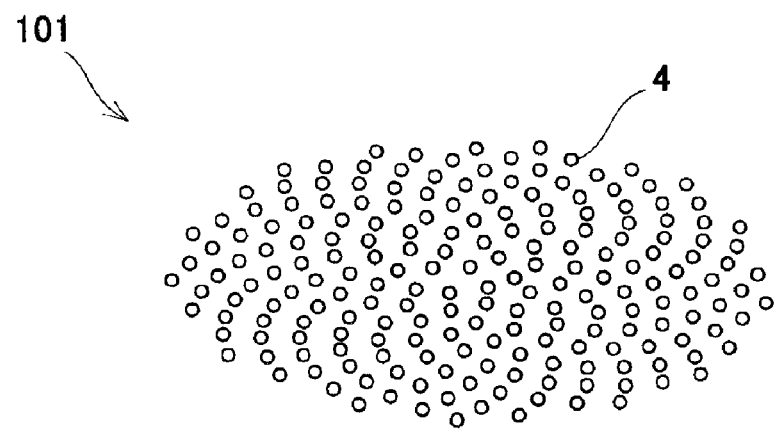

A third embodiment of the present invention shows another example in which the angle of the arrangement of the concave portions in the substantially spiral arrangement is changed. In the first embodiment, the concave portions 4 are arranged at angles of multiples of 137.5 degrees, while as shown in FIG. 9, the concave portions 4 are arranged at angles of multiples of 15 degrees instead of 137.5 degrees. In this case, an arrangement in which the concave portions 4 are arranged in a substantially radial shape is obtained. FIG. 10 shows a cross section taken along line X—X of FIG. 9. FIG. 11 shows a cross section taken along line XI—XI of FIG. 9. With this concave/convex arrangement, the interference of the reflected lights can be suppressed similarly to the first embodiment. Unlike the first and second embodiments, in this embodiment, judging from the X—X cross section shown in FIG. 10 in which the concave/convex portions are arranged at a relatively fixed pitch (repeated according to a rule), there is a possibility that the interference of the reflected lights occurs. However, the XI—XI cross section parallel to the X—X cross section, which is shown in FIG. 11, has the shape different from that of the X—X cross section. In this case, regardless of the fact that the concave/convex portions in a specific cross section are arranged according to a rule, the interference in the entire reflector 101 is unrecognizable to human's eyes. The reason is as follows.

The interference of the diffracted lights due to the regular concave/convex arrangement is observed in a plane when the reflector 101 is observed. The interference of the reflector 101 being observed by the human is recognized by him/her when two conditions are satisfied: 1) the shape of the concave/convex cross section of the straight-line cross section is regular, and 2) the same regularity is repeated in the cross section parallel to the above cross section. In this embodiment, the X—X cross section of FIG. 10 and the XI—XI cross section of FIG. 11 differ in concave/convex shape from each other, that is, the condition 2) is not satisfied. That is, in the reflector having no concave/convex arrangement in which the same regularity is repeated in one direction in the reflecting plane, the interference is unrecognizable and therefore, the interference resulting from the concave/convex arrangement can be prevented. Also, in the arrangement in which such concave/convex arrangement is repeated in one direction, the same regularity is repeated at a pitch, but when the pitch has a certain value or greater and is repeated at a low frequency, the interference is slight and therefore, unrecognizable in practice. The pitch at which the interference is unrecognizable is 50 $\mu$m or more, from the inventor's experience. Since the arrangement pitch of pixels is 50 $\mu$m in a high definition image display, the concave/convex arrangement is satisfactorily applicable to the reflector of the image display.

Fourth Embodiment

A fourth embodiment of the present invention illustrates an example in which the arrangement of the concave portions is altered with irregularity maintained. In the first to third embodiments, the concave portions are arranged in the substantially spiral shape or the substantially radial shape.

Figure 13:
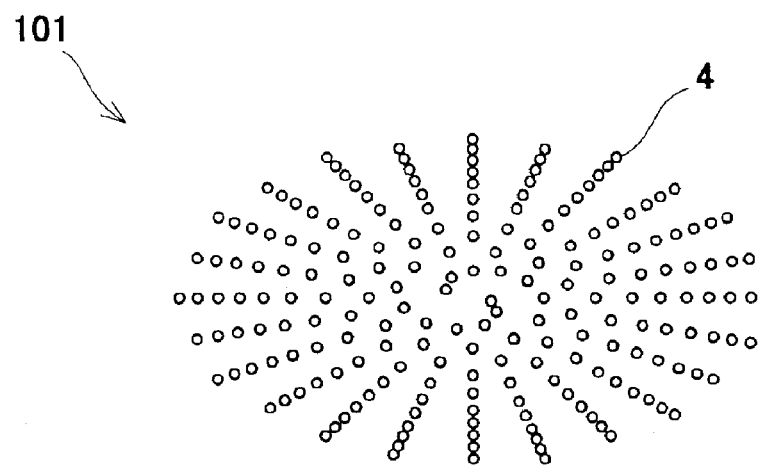
FIG. 13 is a plan view showing another structure of the reflector according to the fourth embodiment of the present invention.

Alternatively, these arrangement shapes can be reduced or expanded in a specific axial direction into a substantially ellipsoidal spiral shape or a substantially ellipsoidal radial shape in which the concave portions are arranged, and also in such arrangement, the same effects can be obtained. FIG. 12 shows the substantially ellipsoidal spiral arrangement and FIG. 13 shows the substantially ellipsoidal radial arrangement.

In the first to fourth embodiments, the arrangement of the concave portions of the concave/convex shape has been described. The arrangement is not limited to that of the concave portions but, by arranging the convex portions in the similar method to fabricate the reflector and the liquid crystal display panel, the same effects can be obtained.

In the first to fourth embodiments, the arrangements of the substantially spiral shape, substantially radial shape, and substantially ellipsoidal spiral shape, and substantially ellipsoidal radial shape have been described. In addition to the reflectors of these arrangements, the reflectors having irregular surface shapes of the arbitrary straight-line cross sections thereof are capable of preventing the interference, and the same effects as provided by the first to fourth embodiments can be provided. Even in the reflector which has a specific cross section with the concave/convex portions regularly arranged, the interference can be prevented and the same effects as provided by the first to fourth embodiments can be provided, if both of the two conditions: 1) the shape of the concave/convex cross section of the straight-line cross section is regular, and 2) the same regularity is repeated in the cross section parallel to the above cross section, are not satisfied in this reflector.

In the first to fourth embodiments, although the substantially spiral, concentric, and radial arrangements based on the arrangement (basic arrangement) in which the concave portions or the convex portions are arranged according to the distance from the center of the spiral of the first embodiment have been described, the substantially spiral, concentric, and radial arrangements need not be based on the basic arrangement in practice. When the substantially spiral, concentric, and radial arrangements are radially regular, they are not regular on a line parallel to the radial direction, and do not satisfy the interference conditions 1), 2). Also, when the concave portions are arranged symmetrically with respect to the center of these arrangements, the arrangements on two parallel lines between which the center is interposed are the same but, in general, the arrangement on the two parallel lines is not regular. If the arrangements should be regular, the interference would hardly occur because they are spaced apart.

Fifth Embodiment

Figure 21:
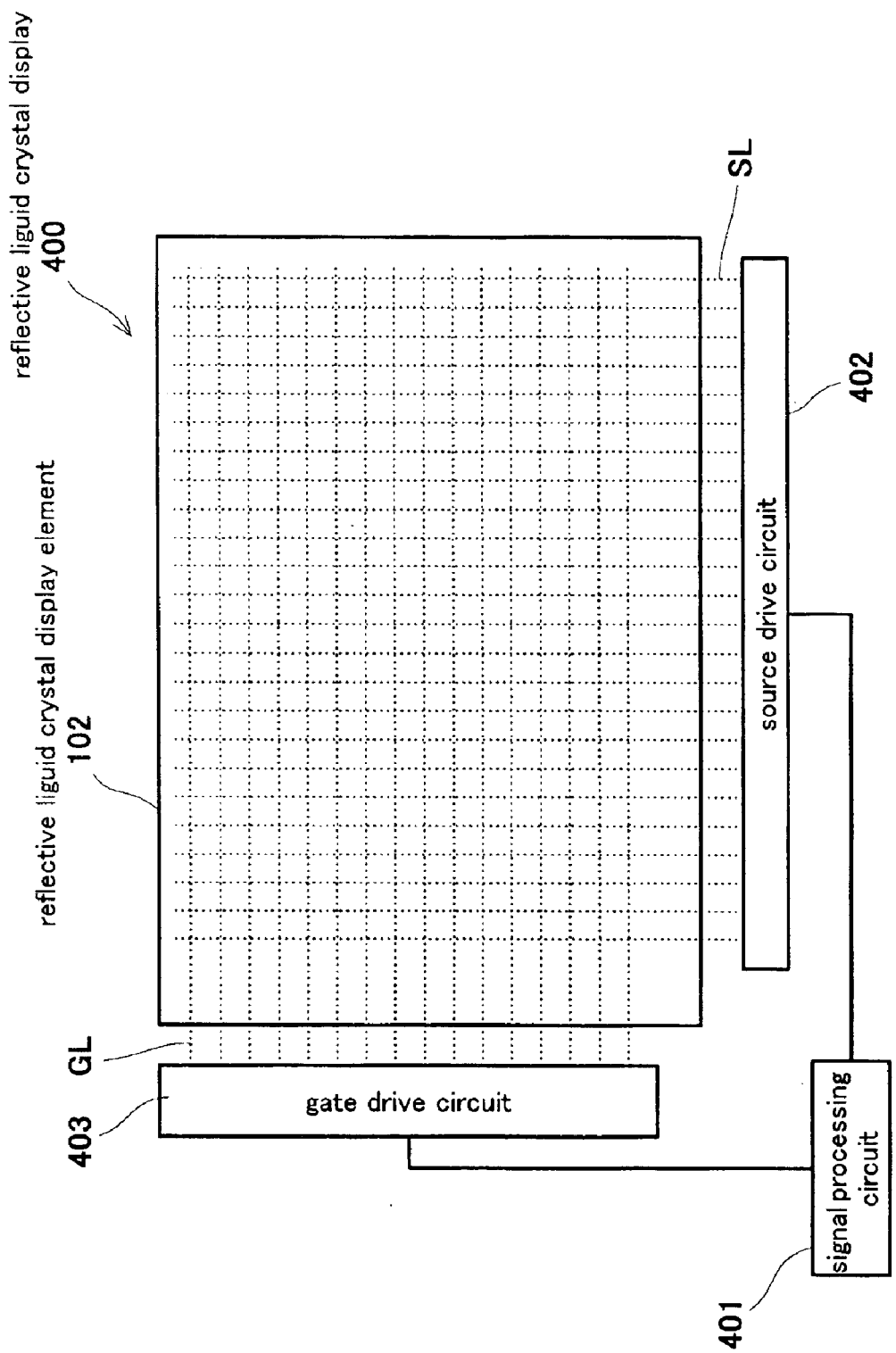
FIG. 21 is a block diagram showing a constitution of a reflective liquid crystal display according to a fifth embodiment of the present invention.

FIG. 21 is a block diagram showing a constitution of a reflective liquid crystal display according to a fifth embodiment of the present invention. As shown in FIG. 21, in a reflective liquid crystal display 400 according to this embodiment, the source line SL and the gate line GL of the liquid crystal display panel 102 of the first embodiment are respectively driven by a source drive circuit 402 and a gate drive circuit 403, which are controlled by a signal processing circuit 401. With this constitution, the liquid crystal display panel 102 is driven by the gate drive circuit 403 and the source drive circuit 402, so that transmittance of the ambient light incident on the pixel reflecting film and reflected thereon is changed. Thereby, the human observing the liquid crystal display 400 sees an image according to the video signal of the source line GL. In this case, since the ambient light is diffused by the pixel reflecting film, preferable visibility is obtained. As a result, a reflective liquid crystal display having preferable and reproducible reflection characteristic is achieved. The reflectors having modifications of the concave arrangement of the first embodiment and the reflectors of the second to fourth embodiments may be used to constitute the reflective liquid crystal display, in which case, the same effects can be provided.

Sixth Embodiment

In the first to fifth embodiments, a phenomenon in which the reflected lights are diffracted due to the concave/convex portions of the surface of the reflector, and the diffracted lights interfere with one another due to the regular concave/convex arrangement, can be suppressed. Thereby, preferable visibility is obtained. The interference of the diffracted lights also occurs in the plane by which the incident light is reflected, transmitted, refracted, or the like. Accordingly, the present invention is effective in suppressing the interference of the diffracted lights in an optical member in which refractive indices, transmittances or the like are distributed in a plane and such distribution is repeated in a similar manner, as well as the interference due to the concave/convex shape of the reflector.

For example, the present invention is applicable to an optical member that diffuses light, namely, a diffusing film, or an optical member in which minute regions for blocking light are arranged in a transparent member for the purpose of reducing the light.

EXAMPLE 1

Figure 22:
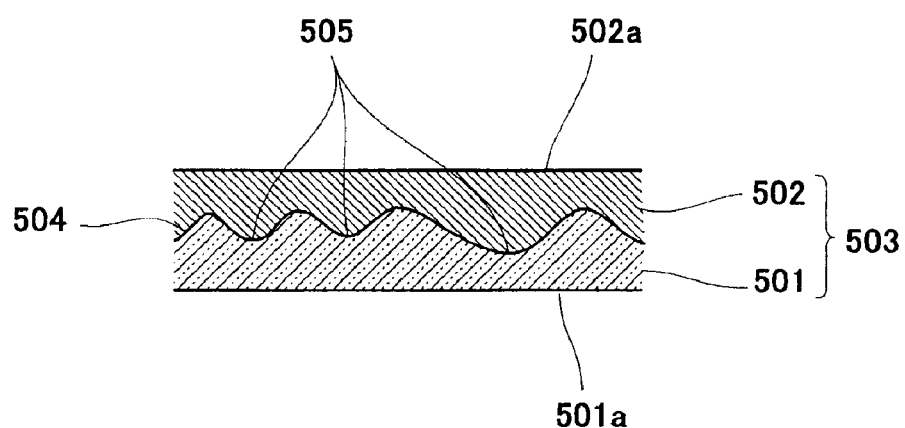
FIG. 22 is a cross-sectional view showing a structure of an optical member according to an Example 1 of a sixth embodiment of the present invention.

An Example 1 of the present invention illustrates an optical member for diffusing light. FIG. 22 is a cross-sectional view showing a structure of an optical member according to this example.

As shown in FIG. 22, an optical member 503 of the Example 1 is composed of an upper layer 502 and a lower layer 501 which are made of two types of transparent materials having different refractive indices. An interface 504 between the upper layer 502 and the lower layer 501 has the concave/convex shape similar to those of the surfaces of the reflectors of the first to fourth embodiments. An upper surface of the upper layer 502 and a lower surface 501a of the lower layer 501 are flat and parallel to each other.

Materials of the upper layer 502 and the lower layer 501 are suitably selected from transparent materials such as glass, a nitride film, indium tin oxide (ITO), acrylic resin, and epoxy resin such that the selected materials have different refractive indices. In this embodiment, the lower layer 501 is made of glass, and the upper layer 502 is made of acrylic resin. In the optical member 503, when light is incident upon either the upper surface 502a of the upper layer 502 or the lower surface 501a of the lower layer 501, the incident light is refracted and diffused on the interface 504 because the interface 504 between the upper layer 502 and the lower layer 501 having the concave/convex shape inclined with respect to the upper surface 502a of the upper layer 502 and the lower surface 501a of the lower layer 501.

Figure 19:
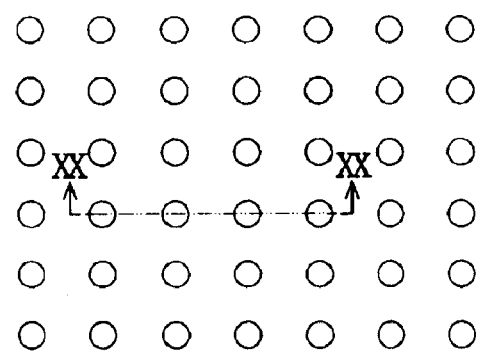
FIG. 19 is a plan view showing an example of concave/convex arrangement of the conventional reflector.
Figure 20:
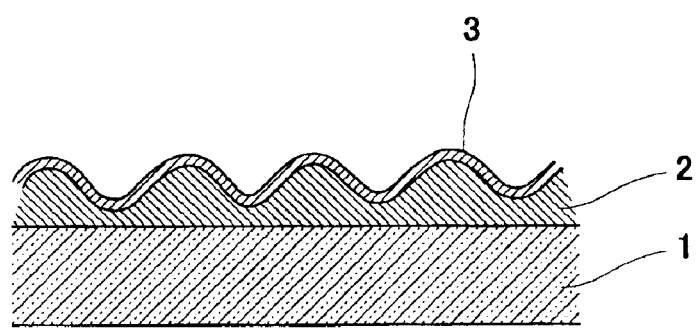
FIG. 20 is a cross-sectional view taken along line XX—XX of FIG. 19.

Thus, because of the inclination of the interface 504, an optical characteristic (here, diffusing characteristic) in the direction of an observation point of the optical member 503 varies in a plane in which the optical member 503 is present and has a distribution with large and small values. Points at which the optical characteristic has a local maximum value or a local minimum value according to inclination of the concave/convex interface 504 are arranged in the plane in which the optical member 503 is present. In description, the point at which the optical characteristic has a local maximum value or a local minimum value in a plane is called an "optical action center". The optical action center is not point at which the characteristic has a maximum/minimum value in the distribution of the entire plane but a point at which the characteristic has a local maximum/minimum value in a portion varying like mountain or valley in the distribution. In this example, bottoms of the concave portions of the interface 504 in the cross section of FIG. 22 are optical action centers 505. When the optical action centers 505 are regularly arranged, the interference of light due to diffraction occurs and the light looks intensified or colored when seen from a specific direction, similarly to the reflectors having concave/convex portions shown in the conventional examples of FIGS. 19, 20. If an attempt is made to randomly arrange the optical action centers to avoid such defects, the characteristic of the optical member might vary depending on a designer when there is no regularity in the arrangement. Accordingly, similarly to the reflectors of the first to fourth embodiments, in the optical member 503 of this example, the optical action centers are arranged in a plane according to a predetermined rule and the optical action centers on an arbitrary straight line in the plane are arranged irregularly, thereby allowing the interference of the diffracted lights to be suppressed and obtaining a preferable diffusing characteristic. Simultaneously, reproducible design can be conducted.

By placing the optical member of this example on the surface of the reflective display having a flat metal reflector, mirroring of the light source in the metal reflector can be suppressed, and a reflective display having a preferable diffusing characteristic is provided.

FIGS. 23(a)–23(d) are cross-sectional views showing steps of a method for fabricating the optical member of FIG. 22.

Figure 23:
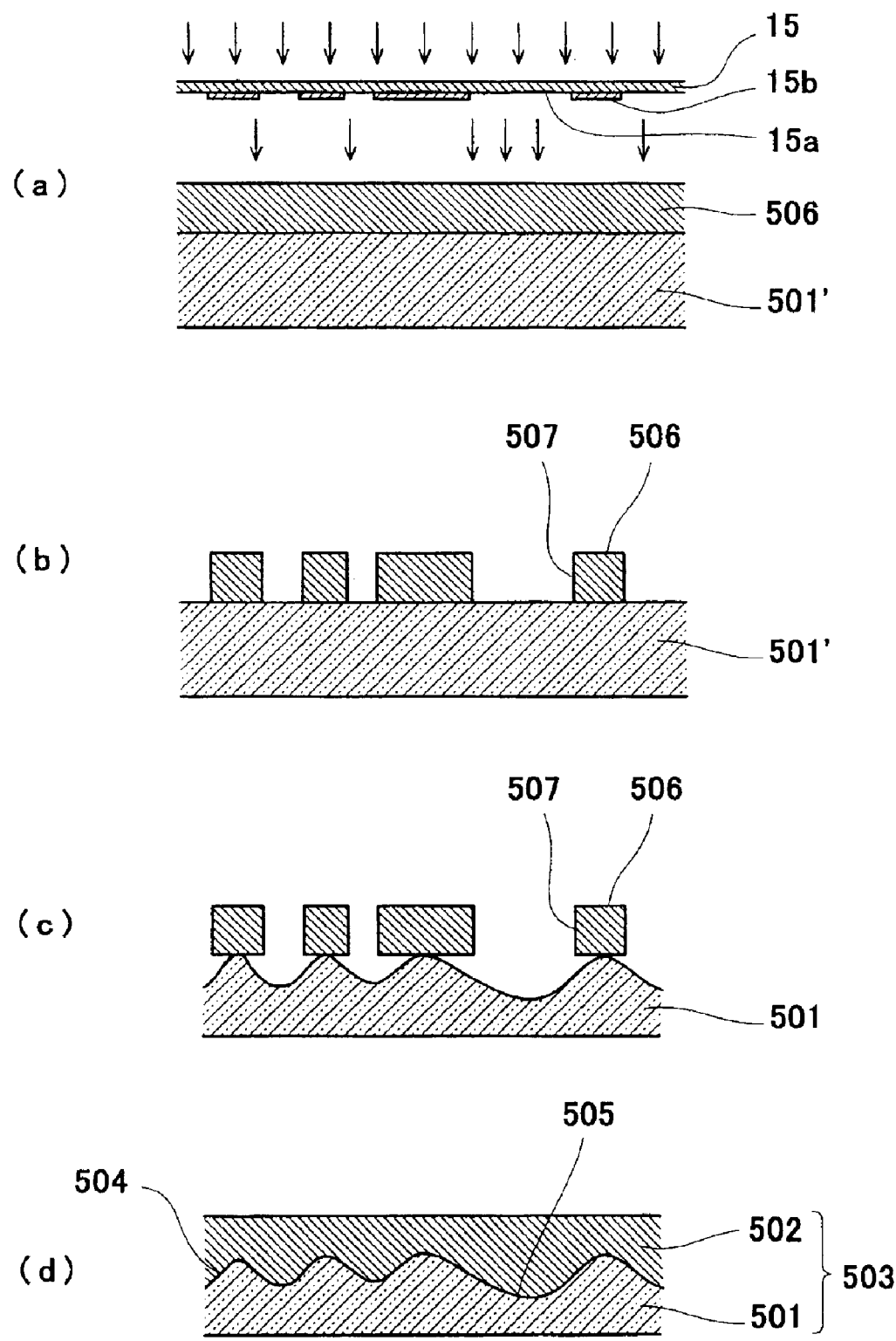
FIGS. 23(a)–23(d) are cross-sectional views showing steps of a method for fabricating the optical member of FIG. 22.

In fabrication of the optical member, as shown in FIG. 23(a), initially, a positive photoresist 506 is applied on a flat glass substrate 501'. Then, mask exposure is carried out using the photomask 15 having light-transmitting regions 15a corresponding to the concave portions and light-blocking regions 15b corresponding to the other portions, thereby making the portions corresponding to the light-transmitting regions 15b of the photoresist 506 photosensitive.

Then, the mask-exposed glass substrate 501' is developed. Thereby, as shown in FIG. 23(b), openings 507 are formed in the photosensitive portions of the photoresist 506.

Then, using the photoresist 506 as a mask, the glass substrate 501' is etched by hydrofluoric acid. Thereby, as shown in FIG. 23(C), the surface of the glass substrate 501' is melted to form the concave/convex portions, thus obtaining the lower layer 501.

Then, the photoresist 506 is peeled off. Thereafter, the acrylic resin is applied on the lower layer 501 and cured to form the upper layer 502 as shown in FIG. 22(d), thereby obtaining the optical member 503. Thus, by the photolithographic method, the optical member 503 of this example can be easily formed.

The photomask 15 for the mask exposure is designed so that similar positional relationship is made between the arrangement of the light-blocking regions 15b or the light-transmitting regions 15a and regularly concentric arrangement on an arbitrary two-dimensional coordinate system. With this design, the optical action centers of the optical member can be regularly arranged in a concentric shape, and the effects of the present invention is obtained. The arrangement of the optical action centers may have a similar positional relationship with the arrangement obtained by symmetrically transforming a plurality of points having a concentric arrangement on the arbitrary two-dimensional coordinate system. Here, symmetric transformation refers to any of rotation at a fixed angle around an axis, mirroring at a straight line, and parallel movement, or otherwise, a combination of these symmetric transformations.

More specifically, the arrangement of the optical action centers may have the substantially concentric shape, the substantially spiral shape, the substantially radial shape, the substantially ellipsoidal spiral shape, or the substantially ellipsoidal radial shape, similarly to the arrangement of the concave portions or the convex portions shown in the first to fourth embodiments. When the number n is given according to the distance from the center of the spiral, the central angle made between the n-th concave portion and the (n+1)-th concave portion may be a multiple of 137.5 degrees, and the distance from the center of the spiral to the optical action center may be proportional to the square root of the n in positional relationship.

EXAMPLE 2

Figure 24:
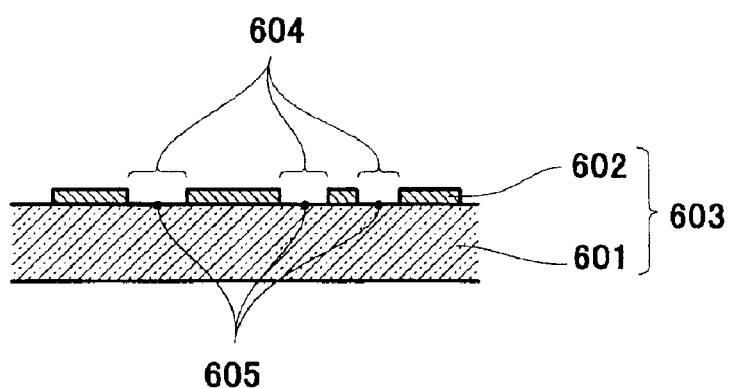
FIG. 24 is a cross-sectional view showing a structure of an optical member according to an Example 2 of a sixth embodiment of the present invention.

FIG. 24 is a cross-sectional view showing a structure of an optical member according to an Example 2 of the present invention. In FIG. 24, an optical member 603 of this example is structured such that a light-blocking layer 602 having many minute openings 604 at predetermined positions is provided on a transparent and flat substrate 601, thereby forming many minute light-transmitting regions in the opening 604 through which the incident light is transmitted and light-blocking regions for blocking the incident light in the other portions. When the light is incident upon the optical member 603, only part of the light passes through the minute light-transmitting regions 604 and the other light is blocked by the light-blocking regions. Hence, the amount of light is reduced. The optical member 603 is placed in front of the light source for the purpose of reducing the amount of excessive light of the light source. The optical member 603 is capable of transmitting the incident light according to the area of the minute light-transmitting regions 604.

By the way, when the minute light-transmitting regions 604 are regularly arranged at equal intervals, the lights diffracted around the minute light-transmitting regions 604 interfere with one another, thereby causing the transmitted light to be intensified in a specific direction or the transmitted light to be colored, as in the case of the reflector having the concave/convex portions. Accordingly, the optical action centers 605 of the minute light-transmitting regions 604 are arranged on the main surface of the substrate 601 according to the predetermined rule, while the optical action centers 605 on an arbitrary straight line in the main surface are arranged irregularly. Thereby, the interference of the diffracted lights is suppressed and preferable transmitted light without coloring can be obtained.

As should be appreciated from the foregoing description, the optical characteristic in this example is transmittance. The light-blocking layer 602 can be easily formed by the photolithographic method. In this case, the photomask is designed in the method similar to the Example 1, so that the optical action centers of the optical member can be provided so as to obtain the effects of the present invention.

In FIG. 24, the minute light-transmitting regions 404 may be replaced by minute regions provided with reflecting films on which the incident light is reflected. Thus, the optical member capable of reflecting the incident light with reduced amount is obtained.

Like the Examples 1, 2, by arranging the optical action centers of each of the optical characteristics such as the refractive index, the transmittance, and the reflectance, in the optical member in which these characteristics have distributions in the plane in which the optical member is present, the interference of the diffracted light can be suppressed.

Seventh Embodiment

A seventh embodiment of the present invention illustrates various optical equipment to which the optical member of the sixth embodiment is applied. Specifically, display means for conducting display is added to the optical member of the sixth embodiment to realize a display such as a reflective liquid crystal display or an EL display. Also, light emitting means is added to the optical member to provide an illuminating device for plane light emission. Further, the optical member may be structured such that the optical action centers are distributed in a display pattern and additionally provided with the light emitting means, thereby obtaining a display panel such as an electric sign and a traffic sign. Hereinbelow, this will be described in detail.

EXAMPLE 3

Figure 25:
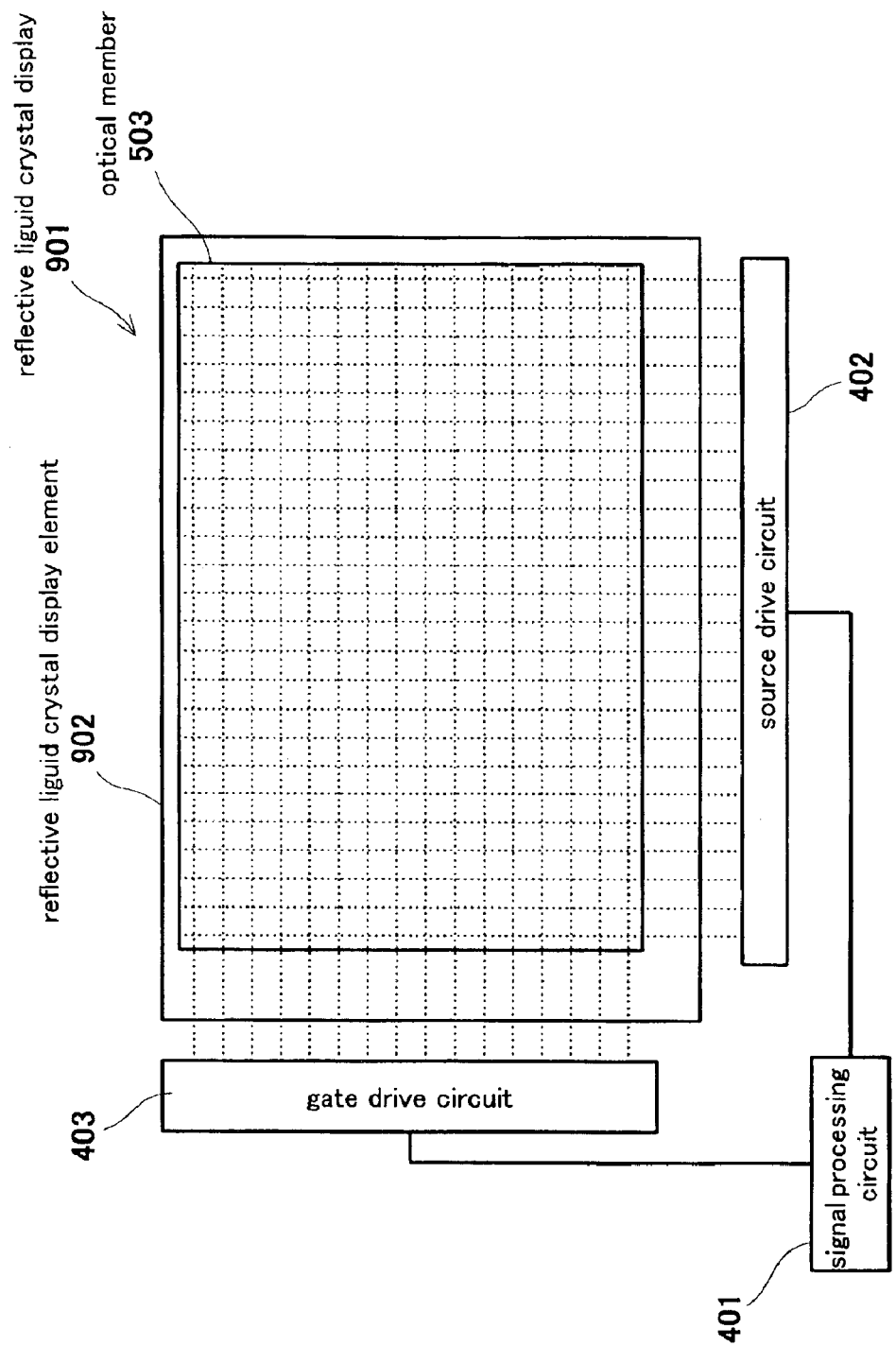
FIG. 25 is a block diagram showing a constitution of a reflective liquid crystal display as a display according to an Example 3 of a seventh embodiment of the present invention.

FIG. 25 is a block diagram showing a constitution of a reflective liquid crystal display as a display according to an Example 3 of the present invention. As shown in FIG. 25, a reflective liquid crystal display 901 of this example adopts a reflective liquid crystal display panel 902 structured such that the reflecting film 3' is flat in the liquid crystal display panel of the first embodiment (see FIG. 4) and is constituted such that the optical member 503 of the Example 1 of the sixth embodiment is placed on a front surface of the reflective liquid crystal display panel 902, and the source lines SL and the gate lines GL are respectively driven by the source drive circuit 402 and the gate drive circuit 403 which are controlled by the signal processing circuit 401. With this constitution, the ambient light incident on the reflective liquid crystal display panel 902 is mirror-reflected on the flat reflecting film, and the incident and reflected light is diffused by the optical member 503. Therefore, a wide viewing angle characteristic is obtained. Besides, the wide viewing angle characteristic has reproducibility in design.

EXAMPLE 4

Figure 26:
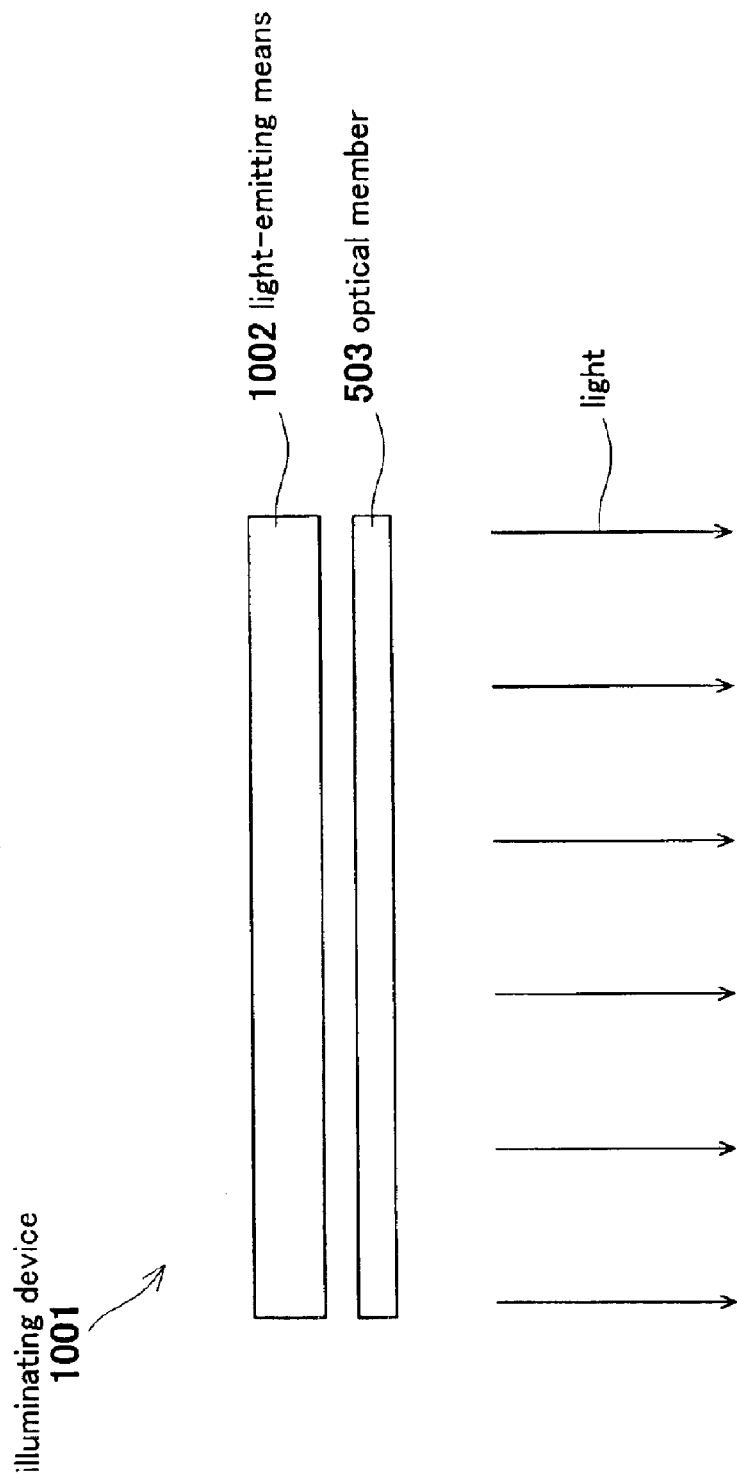
FIG. 26 is a schematic view showing a constitution of an illuminating device according to an Example 4 of the seventh embodiment of the present invention.

FIG. 26 is a schematic view showing a constitution of an illuminating device according to an Example 4 of the present invention. As shown in FIG. 26, in an illuminating device 1001 of this example, the optical member 503 of the Example 1 of the sixth embodiment is placed in front of light-emitting means 1002 comprising a non-planar light source such as a lamp. With this constitution, the light emitted from the light emitting means 1002 is diffused while traveling through the optical member 503. Therefore, the illuminating device performing plane light emission with a preferable diffusing characteristic is provided. Besides, the characteristic of the light emission has reproducibility in design.

EXAMPLE 5

Figure 27:
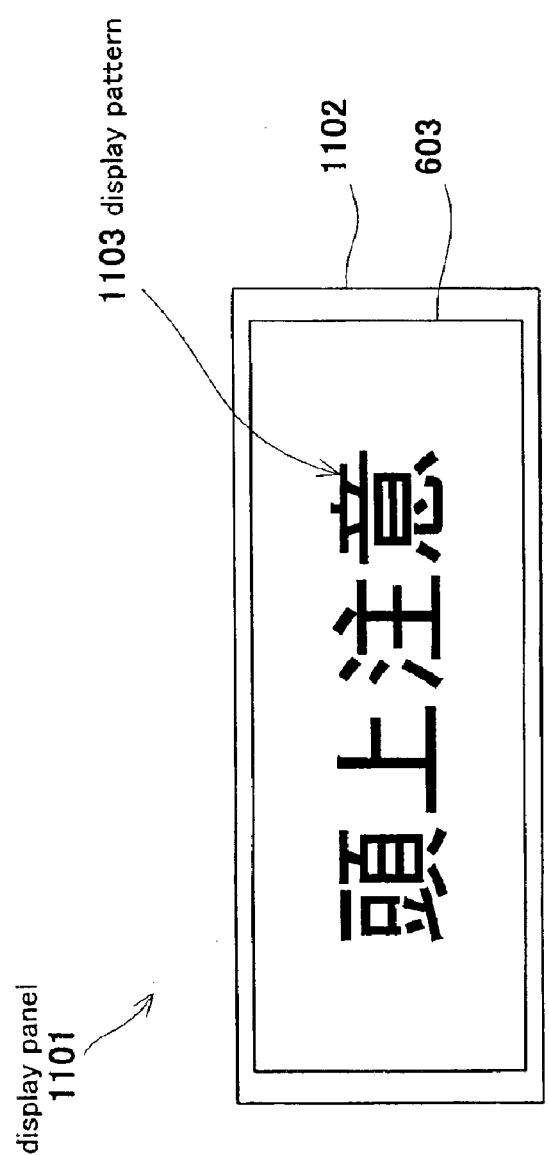
FIG. 27 is a front view showing a configuration of a display panel according to an Example 5 of the seventh embodiment of the present invention.

FIG. 27 is a front view showing a configuration of a display panel according to an Example 5 of the present invention. In FIG. 27, in a display panel 1101, the optical member 603 of the Example 2 of the sixth embodiment in which the optical action centers are distributed in a display pattern 1103 is placed in front of the light emitting means 1102. With this constitution, the light emitted from the light emitting means 1102 is transmitted through the minute light-transmitting regions distributed in the pattern 1103 of the optical member 603, and the display pattern 1103 serves to emit light. Therefore, the display panel without coloring or the like can be provided. Besides, the light emitting characteristic of the display pattern has reproducibility in design.

Eighth Embodiment

In the first to seventh embodiments, applications of the present invention to the optical equipment have been described. The present invention is directed to suppressing the interference of diffracted lights, and therefore, is applicable to any type of wave such as a sound wave, an electromagnetic wave, and an oscillating wave, as well as light. By applying the present invention to these waves, an acoustic member, a radio wave member, an electromagnetic wave member, and an oscillating member can be provided. Specifically, the constitution of the present invention provides a member capable of suppressing the intensification of waves having a specific cycle or frequency and having a uniform characteristic when the wave is reflected or transmitted. Herein, the concept of the optical action centers defined in the sixth embodiment is broadened into the wave action centers. The wave action centers refer to points at which a wave-relating characteristic takes extremal values such as a local maximum value or a local minimum value in a plane. When the wave is the acoustic wave, the radio wave, the electromagnetic wave, and the oscillating wave, the wave action centers are respectively the acoustic action centers, the radio wave action centers, the electromagnetic action centers, and the oscillating action centers. To be specific, the wave-relating characteristics refer to reflection, refraction, transmission and the like of the wave. Hereinbelow, this will be described in detail.

EXAMPLE 6

Figure 28:
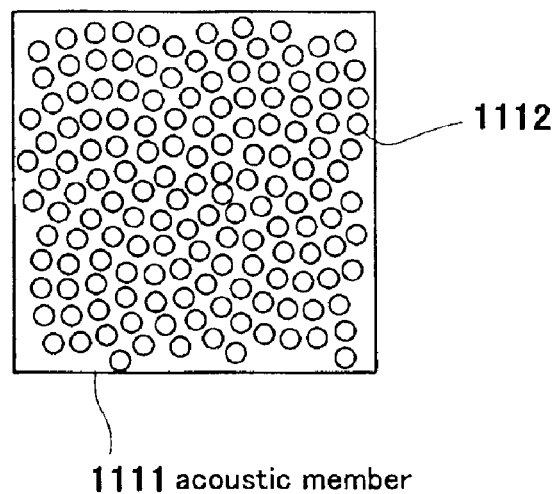
FIG. 28 is a front view showing a structure of an acoustic member according to an Example 6 of an eighth embodiment of the present invention.

FIG. 28 is a front view showing a structure of an acoustic member according to an Example 6 of the present invention. As shown in FIG. 28, an acoustic member 1111 of this example is structured such that minute echo regions 1112 for echoing sound are formed on a surface of a sound absorption member that serves to absorb sound into the surface. The acoustic member 1111 is capable of controlling the degree at which the sound echoes depending on an area of the minute echo regions 1112. By arranging the acoustic action centers of the minute echo regions similarly to the optical action centers of the sixth embodiment, the intensification of the sounds having a specific frequency can be suppressed, and the acoustic member having a uniform acoustic characteristic can be provided. By providing the acoustic member on a wall face or the like of an acoustic room, a preferable acoustic room is provided.

EXAMPLE 7

In some cases, interference noise also occur in the radio wave, the electromagnetic wave, and the oscillation, because the waves having a specific frequency are intensified in a specific observation direction. In case of the radio wave, reception trouble in which receptions in broadcasting equipment cross each other. In case of the electromagnetic wave, sensitivity trouble occurs in an imaging panel that performs measurement with sensitivity with respect to the electromagnetic wave. In case of oscillation, interference noise occurs in propagation or the like in which strong oscillation propagates in a specific direction. With the constitution of the present invention in which regions having different characteristics or distributions of characteristics are arranged according to a predetermined rule, the member capable of suppressing the interference noise due to the intensified waves and having a uniform wave characteristic is obtained.

Figure 29:
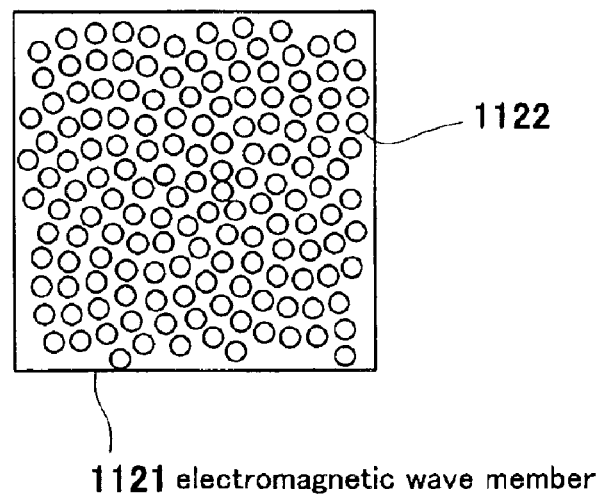
FIG. 29 is a front view showing a structure of an electromagnetic wave member according to an Example 7 of the eighth embodiment of the present invention.
Figure 30:
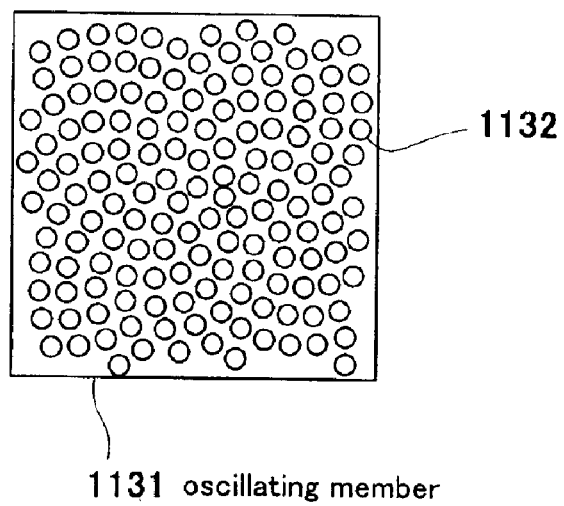
FIG. 30 is a front view showing a structure of an oscillating member according to the Example 7 of the eighth embodiment of the present invention.
Figure 31:
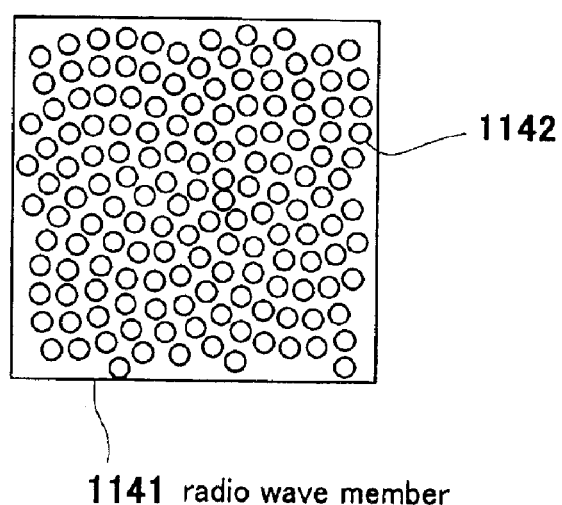
FIG. 31 is a front view showing a radio wave member according to the Example 7 of the eighth embodiment of the present invention.

FIG. 29 is a front view showing a structure of an electromagnetic wave member according to an Example 7 of the present invention. FIG. 30 is a front view showing a structure of an oscillating member according to the Example 7 of the present invention. FIG. 31 is a front view showing a structure of a radio wave member according to the Example 7 of the present invention. In these Figures, an electromagnetic wave member 1121, an oscillating member 1131, a radio wave member 1141 are respectively provided with minute electromagnetic action regions 1122, oscillating action regions 1132, and minute radio-action regions 1142 in the corresponding planes in which these members are present. The minute electro magnetic action regions 1122, the minute oscillating action regions 1132, and the minute radio-action regions 1142 are regions in which characteristics such as the reflectance, the transmittance, the refractive index, the radiation intensity or the like, which are respectively associated with the electromagnetic wave, the oscillation, and the radio wave, vary like mountain or valley in the planes in which the members 1121, 1131, 1141 are present, i.e., the local maximum point neighborhood regions or local minimum point neighborhood regions. The arrangement of the action centers of the minute electromagnetic action region 1122, the minute oscillating action regions 1132, and the minute radio-action regions 1142 are similar to the arrangement of the optical action centers shown in the sixth embodiment.

While in the first to eighth embodiments, the shapes of the reflector, the optical member, and the wave member are flat surfaces, these shapes may be curved surfaces. Specifically, when the curvature of the member as a wave source is larger than the wavelength of the wave, the interference due to diffraction of the wave occurs. Therefore, the present invention is applicable to such cases as in the case where the members as the wave source are flat surfaces.

Numerous modifications and alternative embodiments of the invention will be apparent to those skilled in the art in view of the foregoing description. Accordingly, the description is to be construed as illustrative only, and is provided for the purpose of teaching those killed in the art the best mode of carrying out the invention. The details of the structure and/or action maybe varied substantially without departing from the spirit of the invention and all modifications which come within the scope of the appended claims are reserved.

Industrial Applicability

A light reflector and a fabrication method thereof according to the present invention are employed in a liquid crystal display panel and a fabrication method thereof.

A reflective liquid crystal display and a fabrication method thereof according to the present invention are employed in a display of a personal computer, a liquid crystal television, a liquid crystal monitor, and the like and fabrication methods thereof.

An optical member according to the present invention is employed in a light diffusing film, a light reducing member or the like.

A display according to the present invention is employed as a reflective liquid crystal display or an EL display.

An illuminating device according to the present invention is employed as an illuminating device that performs plane light emission.

A display panel of the present invention is employed as an electric sign, a traffic sign, a construction sign, or the like.

A wave member according to the present invention is employed as an acoustic member constituting an acoustic room, a radio wave member for receiving or reflecting a radio wave, an imaging element for measurement with sensitivity to the electromagnetic wave, and an oscillating member for transmitting or reflecting oscillation.

What is claimed is:

1. A reflector having a concave/convex share in a surface thereof, characterized in that at least part of concave portions or convex portions of the concave/convex shape are arranged regularly according to a predetermined rule so as to have a reproducible reflection characteristic, and the concave/convex shape of an arbitrary straight-line cross section is irregular, wherein the at least art of the concave portions or the convex portions of the concave/convex shape are arranged in a substantially spiral shape, including the concave portions or the convex portions in which a central angle made between a n-th concave/convex portion and a (n+1)-th concave/convex portion is a multiple of 137.5 degrees when the concave portions or the convex portions are numbered using n according to a distance from a center of the spiral.

2. A reflector having a concave/convex shape in a surface thereof, characterized in that at least part of concave portions or convex portions of the concave/convex shape are arranged regularly according to a predetermined rule so as to have a reproducible reflection characteristic, and the concave/convex shape of an arbitrary straight-line cross section is irregular, wherein the at least part of the concave portions or the convex portions of the concave/convex shape are arranged in a substantially spiral shape, including the concave portions or the convex portions in which a distance from a center of the spiral to a concave/convex portion is proportional to a square root of n when the concave portions or the convex portions are numbered using n according to the distance from the center of the spiral.

3. A reflector having a concave/convex shape in a surface thereof, characterized in that at least part of concave portions or convex portions of the concave/convex shape are arranged regularly according to a predetermined rule so as to have a reproducible reflection characteristic, and the concave/convex shape of an arbitrary straight-line cross section is irregular, wherein the at least part of the concave portions or the convex portions of the concave/convex shape are arranged so as to have a positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

4. A reflector having a concave/convex shape in a surface thereof, characterized in that at least part of concave portions or convex portions of the concave/convex shape are arranged regularly according to a predetermined rule so as to have a reproducible reflection characteristic, and concave/convex shaves of arbitrary parallel straight-line cross sections do not have the same regularity, wherein the at least part of the concave portions or the convex portions of the concave/convex shape are arranged in a substantially spiral shape, including the concave portions or the convex portions in which a central angle made between a n-th concave/convex portion and a (n+1)-th concave/convex portion is a multiple of 137.5 degrees when the concave portions or the convex portions are numbered using n according to a distance from a center of the spiral.

5. A reflector having a concave/convex shave in a surface thereof, characterized in that at least part of concave portions or convex portions of the concave/convex shave are arranged regularly according to a predetermined rule so as to have a reproducible reflection characteristic, and concave/convex shapes of arbitrary parallel straight-line cross sections do not have the same regularity, wherein the at least part of the concave portions or the convex portions of the concave/convex shape are arranged in a substantially spiral shape, including the concave portions or the convex portions in which a distance from a center of the spiral to a concave/convex portion is proportional to a square root of n when the concave portions or the convex portion are numbered using n according to the distance from the center of the spiral.

6. A reflector having a concave/convex shape in a surface thereof, characterized in that at least part of concave portions or convex portions of the concave/convex shape are arranged regularly according to a predetermined rule so as to have a reproducible reflection characteristic, and concave/convex shares of arbitrary parallel straight-line cross sections do not have the same regularity, wherein the at least part of the concave portions or the convex portions of the concave/convex shape are arranged so as to have positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

7. An optical member characterized in that an optical characteristic in an observation point direction varies in a plane, at least part of optical action centers at which the optical characteristic has a local maximum value or a local minimum value are arranged in the nine regularly according to a predetermined rule so as to have a reproducible characteristic, and the optical action centers on an arbitrary straight line in the plane are arranged irregularly, wherein at least part of the optical action centers may be arranged in a substantially spiral shape, including the optical action centers in which a central angle made between a n-th optical action center and a (n+1)-th optical action center is a multiple of 137.5 degrees when the optical action centers are numbered using n according to a distance from a center of the spiral.

8. An optical member characterized in that an optical characteristic in an observation point direction varies in a plane, at least part of optical action centers at which the optical characteristic has a local maximum value or a local minimum value are arranged in the plane regularly according to a predetermined rule so as to have a reproducible characteristic, and the optical action centers on an arbitrary straight line in the plane are arranged irreaularly, wherein at least part of the optical action centers may be arranged in a substantially spiral shape, including the optical action centers in which a distance from a center of the spiral to an optical action center is proportional to a square root of n when the optical action centers are numbered using n according to the distance from the center of the spiral.

9. An optical member characterized in that an optical characteristic in an observation point direction varies in a plane, at least part of optical action centers at which the optical characteristic has a local maximum value or a local minimum value are arranged in the plane regularly according to a predetermined rule so as to have a reproducible characteristic, and the optical action centers on an arbitrary straight line in the plane are arranged irregularly, wherein at least part of the optical action centers are arranged so as to have positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

10. An optical member characterized in that an optical characteristic in an observation point direction varies in a plane, at least part of optical action centers at which the optical characteristic has a local maximum value or a local minimum value are arranged in the plane regularly according to a predetermined rule so as to have a reproducible characteristic, and the optical action centers on arbitrary parallel straight lines in the plane do not have the same regularity, wherein at least part of the optical action centers are arranged in a substantially spiral shape, including the optical action centers in which a central angle made between a n-th optical action center and a (n+1)-th optical action center is a multiple of 137.5 degrees when the optical action centers are numbered using n according to a distance from a center of the spiral.

11. An optical member characterized in that an optical characteristic in an observation point direction varies in a plane, at least part of optical action centers at which the optical characteristic has a local maximum value or a local minimum value are arranged in the plane regularly according to a predetermined rule so as to have a reproducible characteristic, and the optical action centers on arbitrary parallel straight lines in the plane do not have the same regularity, wherein at least part of the optical action centers are arranged in a substantially spiral shape, including the optical action centers in which a distance from a center of the spiral to an optical action center is proportional to a square root of n when the optical action centers are numbered using n according to the distance from the center of the spiral.

12. An optical member characterized in that an optical characteristic in an observation point direction varies in a plane, at least part of optical action centers at which the optical characteristic has a local maximum value or a local minimum value are arranged in the plane regularly according to a predetermined rule so as to have a reproducible characteristic, and the optical action centers on arbitrary parallel straight lines in the plane do not have the same regularity, wherein at least part of the optical action centers are arranged so as to have positional relationship similar to a plurality of points on an arbitrary two-dimensional coordinate system obtained when a radius of a coordinate from an origin is a square root of n as a natural number and a phase angle is 137.5 degrees×n on the arbitrary two-dimensional coordinate system.

* * * * *

UNITED STATES PATENT AND TRADEMARK OFFICE
CERTIFICATE OF CORRECTION

PATENT NO. : 6,873,384 B2
DATED : March 29, 2005
INVENTOR(S) : Yasuhiko Yamanaka et al.

It is certified that error appears in the above-identified patent and that said Letters Patent is hereby corrected as shown below:

Title page, Item [54] and Column 1, line 1,
Title, change "TYRE" to -- TYPE --;

Column 24,
Line 15, change the phrase "concave/convex share" to -- concave/convex shape --;
Line 22, change the phrase "at least art of the" to -- at least part of the --;

Column 25,
Line 2, change the phrase "and concave/convex shaves of" to -- and concave/convex shapes of --;
Line 14, change the phrase "a concave/convex shave in" to -- a concave/convex shape in --;
Line 17, change the phrase "concave/convex shave are" to -- concave/convex shape are --;
Line 36, change the phrase "and concave/convex shares of" to -- and concave/convex shapes of --;
Line 51, change the phrase "arranged in the nine" to -- arranged in the plane --;

Column 26,
Line 6, change the phrase "are arranged irreaularly" to -- are arranged irregularly --.

Signed and Sealed this

Sixteenth Day of August, 2005

JON W. DUDAS
*Director of the United States Patent and Trademark Office*